United States Patent [19]

Chauvel

[11] Patent Number: 4,799,146

[45] Date of Patent: Jan. 17, 1989

[54] SYSTEM FOR DISPLAYING GRAPHIC INFORMATION ON VIDEO SCREEN EMPLOYING VIDEO DISPLAY PROCESSOR

[75] Inventor: Gerard Chauvel, Cagnes/Mer, France

[73] Assignee: Texas Instruments Incorporated, Dallas, Tex.

[21] Appl. No.: 746,422

[22] Filed: Jun. 19, 1985

[30] Foreign Application Priority Data

Jun. 29, 1984 [FR] France ................................ 84 10377

[51] Int. Cl.[4] ................................................ G06F 13/18

[52] U.S. Cl. ...................................... 364/200; 364/518

[58] Field of Search ............... 340/723, 725, 747, 703, 340/750; 364/200 MS File, 900 MS File, 521, 518, 200

[56] References Cited

U.S. PATENT DOCUMENTS

| | | | |
|---|---|---|---|
| 4,070,710 | 1/1978 | Sukonick et al. | 364/900 |
| 4,080,652 | 3/1978 | Cronshaw et al. | 364/200 |
| 4,117,473 | 9/1978 | Haberger, Jr. et al. | 340/750 X |
| 4,215,399 | 7/1980 | Pavicic et al. | 364/200 X |
| 4,303,986 | 12/1981 | Lans | 340/703 X |
| 4,495,594 | 1/1985 | Eggebrecht et al. | 340/723 X |
| 4,511,965 | 4/1985 | Rajaram | 364/200 |
| 4,595,996 | 6/1986 | Morley et al. | 364/900 |
| 4,620,289 | 10/1986 | Chauvel | 340/723 X |
| 4,621,319 | 11/1986 | Braun et al. | 364/200 |
| 4,677,573 | 6/1987 | Brown et al. | 364/521 |

*Primary Examiner*—Gary V. Harkcom
*Assistant Examiner*—David L. Clark
*Attorney, Agent, or Firm*—William E. Hiller; N. Rhys Merrett; Melvin Sharp

[57] ABSTRACT

A system which interprets the contents of address and data fields provided by a central processing unit 1 which controls the display. The address fields are selectively interpreted to obtain a direct access by the central processing unit to a general system memory 5, or so as to constitute instructions for a video processor 2. In this latter case, the address controls an operation cycle of a first priority for controlling the processor or executes a series of operations with a lower priority, such lower priority operations allowing processor 2 to process image information without the intervention of the central unit. The invention finds application in such areas as teletext systems and video games.

5 Claims, 27 Drawing Sheets

SYSTEM FOR DISPLAYING GRAPHIC INFORMATION ON VIDEO SCREEN EMPLOYING VIDEO DISPLAY PROCESSOR

This application is related to application Ser. No. 746,594 and to application Ser. No. 746,595, both filed June 19, 1985 and both assigned to Texas Instruments Incorporated.

BACKGROUND OF THE INVENTION

This invention relates to a method and system for displaying visual information on a screen by line by line and point by point sweeping.

Some methods and systems of this type are described in the following patents and patent applications:

FR No. 2 406 250, EP No. 0 055 167, EP No. 0 056 207, EP No. 0 055 168, EP No. 0 054 490, and U.S. applications Ser. No. 583,072 filed Feb. 23, 1984 and assigned to Texas Instruments Incorporated, U.S. Pat. No. 4,623,986 issued Nov. 11, 1986 and assigned to Texas Instruments Incorporated, and U.S. Pat. No. 4,620,289 issued Oct. 28, 1986 and assigned to Teas Instruments Incorporated.

These prior systems teach a method for displaying visual information on a screen by line by line and point by point frame sweeping, including:

(a) Controlling all the operations of image display and composition by means of related address and data fields provided by a programmed central processing unit, this central processing unit cooperating with a memory and a video processor by a multiplexed time sharing data and address bus for preparing each frame and displaying it on said screen.

(b) Controlling access to said memory as a function of predetermined priorities with a dynamic access circuit for the memory.

(c) Assigning to certain addresses in said address fields an instruction function for the video processor so that it can utilize the consecutive data field at this address for its own needs.

(d) Distributing the consecutive data fields, as a function of the address field assignment, either to the memory or to said video processor.

In the method described in the above cited patent application No. 83 03 142, a data field, following an address field interpreted as an instruction for the video processor can be reused as many times as necessary without the intervention of the central processing unit, the video processor operating on a series of consecutive addresses from the initially provided address, calculating them in its own calculation unit. Such a repetitive operation can be useful, for example, in preparing in the memory a page to be displayed in which a large portion is made up of a single background color. In these conditions, the data representing this color can be loaded into the adjacent emplacements of the memory by increasing each time the address by a unit, all of this being controlled by the memory dynamic access control circuit.

This procedure entails the considerable advantage of discharging the central processing unit from a part of its task and thereby gaining a considerable amount of processing time. A central processing unit consisting of a microprocessor has a cycle time in the order of one microsecond, while the access time to the memory, if it is effected by the video processor, is about one hundred nanoseconds.

It would therefore be desireable to release the central processing unit of all of its "secondary" tasks, which are not directly connected with the control of the system, as, for example, the animation of a part of the image, changing a form, rotating a part of an image, etc.

SUMMARY OF THE INVENTION

The invention has therefore, as an object, an improvement in the method described above whereby there is an augmentation in the image processing and composition possibilities by the video processor and thus an even greater liberation of the central processing unit so that the CPU can concentrate practically exclusively on system control.

The invention has therefore, as an object, such a method which is characterized in that it also includes:

(a) Determining, from the value of the address field itself, if this address is an instruction code for the video processor or a direct access address from the central processing unit to the memory.

(b) Assigning, to certain of said values, an operation mode called a "foreground" mode, by means of which the central processing unit can place the consecutive data into said video processor with a higher priority determined by said access control circuit.

(c) Assigning, to certain others values of the address field interpreted as an instruction, an operation mode called "background" mode by means of which said central processing unit effects, based on the contents of the consecutive data field, a series of memory cycles to be executed by the video processor with a lower priority determined by said control circuit, with addresses which this processor itself processes from data previously provided to it from the central unit.

(d) Interrupting the execution of said series of cycles in the video processor when said central unit again provides an address field, the contents specifying the "foreground" operation mode.

Because of these characteristics, it is possible to process data and data groups in the video processor at its own speed without intervention of the central processing unit which retains initiative over system control by interrupting the execution of a series of operations in progress in the video processor if the CPU, itself, wishes to access the processor.

According to another aspect of the invention, the method also consists, during the interruption in execution of a series of operations of the background mode type, in memorizing the last address and data fields in the process of execution in the video processor and continuing this execution after termination of a control cycle by said central unit in a foreground mode.

In this case as well, the video processor has total control over the execution of a series of operations without the intervention of the central unit.

According to another aspect of this invention, the method includes loading in advance a series of instructions into said memory and executing these instructions in a background mode in the video processor without the intervention of the central unit.

This particularly useful feature allows program loops in a mode called a "task" mode at the processing speed of the video processor while the central unit operates independently with its own program, for example, in effecting figure displacements on the screen, incrustations, and other manipulations relating directly to system management.

The invention also has as its object a visualization system on a video screen in a graphic mode in which the visual information to be displayed is defined on the screen by line by line and point by point sweeping of a frame, this system including:

a memory with direct access to at least one zone in which is stored at any given instant the information necessary for the display of a frame.

a central processing unit for composing the information to be displayed.

a video display processor for processing a part of the information provided by said central unit and for preparing display images from this information with said memory.

a communication bus interconnecting said memory, said central unit, and said video display processor.

a control circuit for dynamic access to said memory for time allocating all of the accesses to the memory as well as the transfer of information on said communication bus.

an interpretation means for interpreting the information provided by the central processing unit so that certain of said address fields are interpreted as instructions for the video display processor, including the means for transforming a field in question either into a foreground instruction, the execution of which is ordered immediately as a function of a priority order for memory accessing determined by said control circuit, or into an instruction of the background type entailing a plurality of successive access cycles to the memory but whose execution is ordered with a lower priority after execution of all foreground instructions, said access control circuit being capable of interrupting the execution of a series of cycles of the background type when a cycle of the foreground type is to be executed.

The invention will be more completely described in the description which follows, given as an example, and in reference to the drawings.

DETAILED DESCRIPTION OF THE PREFERRED EMBODIMENT

Figure 1:
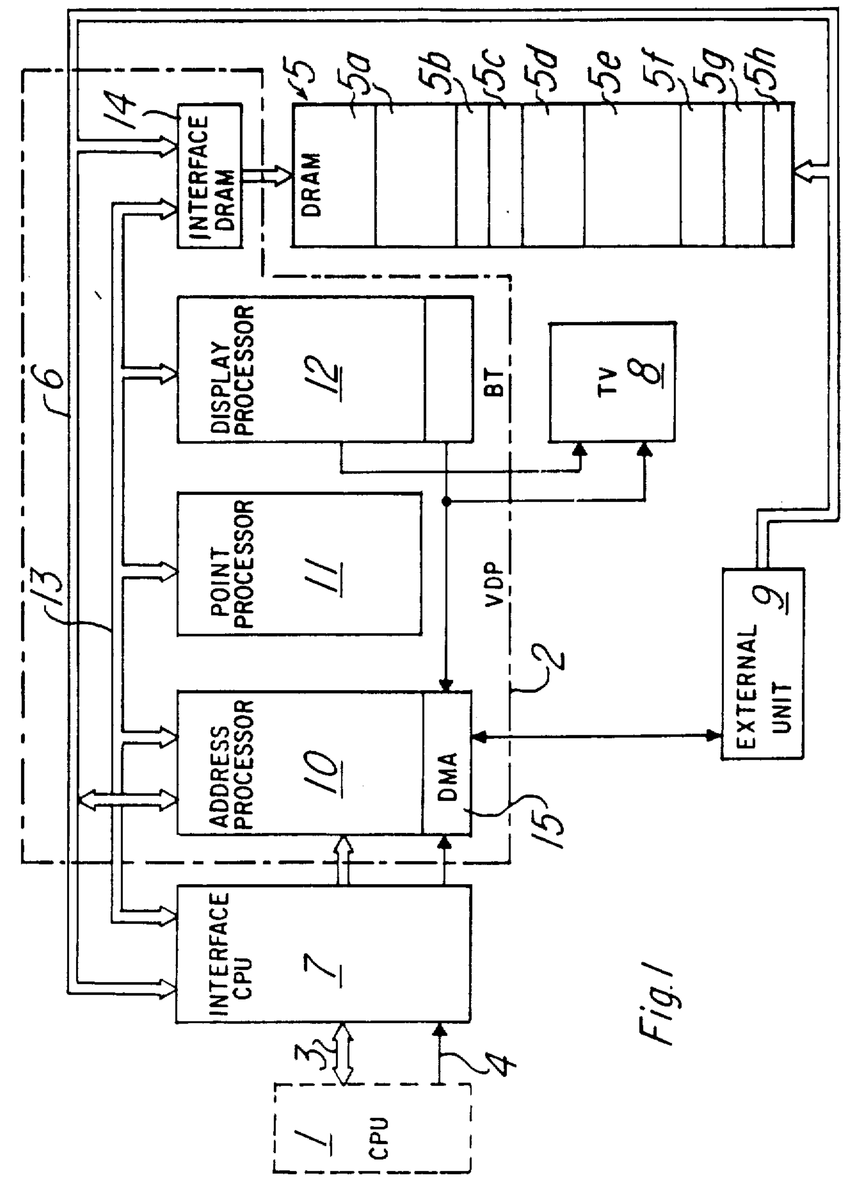
FIG. 1 is a simplified schematic of a data visualization system on a video screen according to the invention.

FIG. 1 shows a much simplified schematic of a display system using the point processor according to the invention. This system includes several units, namely:

A central processing unit 1, CPU, which controls all the operations of the system by means of a program stored in the CPU's memory.

A video display processor 2, VDP, which communicates with the CPU by bus 3 and control line 4, the address and data information circulation on bus 3 being time multiplexed according to the process described in French patent application No. 83 03 142, filed Feb. 25, 1983, by the instant applicant.

A dynamic random access memory 5, DRAM, which communicates with the other units of the system by bus 6 in time sharing, this bus being connected to CPU 1 over interface 7.

A display unit 8 which can be a conventional television or a conventional monitor, this unit being adapted to display the visual information process in the system according to the invention by means of, for example, a cathode ray tube.

An external unit 9, or didon, by means of which the inventive system communicates with an external information source which might be, for example, a teletext emitter connected to the system by, for example, a radio transmitted television channel, or by a telephone line, or otherwise. The external unit 9 loads the information into memory 5 to effect, after processing in the system, the display of the information on the screen of display unit 8.

The video display processor includes an address process 10, a point processor 11 for operating on the points of the screen of unit 8, to obtain, for example, changes in the image form, and a display processor 12, these units all communicating over time sharing bus 6, and bus 13, over which only data can circulate.

Buses 6 and 13 are connected to DRAM memory 5 over interface 14 which multiplexes the data and addresses destined for DRAM 5. There is also provided a control unit 15 with dynamic access to DRAM memory 5. This unit is described in detail in French Pat. No. FR -A-2 406 250 and in French patent application No. 83 03 143, filed Feb. 25, 1983, by the instant applicant, and this unit will be referred to, hereinafter, as DMA circuit 15. In addition, there is provided a time base circuit BT associated with the display processor and communicating with DMA 15, television monitor 8, and the display processor itself. There is a detailed description of the display processor in French patent application No. 83 06 741 filed Apr. 25, 1983, pk by the applicant.

It has been indicated above that CPU 1 communicates with VDP 2 over a single multiplex bus 3 which carries information under control of the signals themselves transmitted on line 4 in such a way that the addresses which are transmitted over this bus can be used, on the one hand, as addresses for DRAM memory 5 when CPU 1 communicates directly with this memory, and by means of which the consecutive data field is utilized to read or write in the memory, or, on the other hand, as an instruction field placing VDP 2 into a particular configuration for processing the data contained in the consecutive data field.

More specifically, in the said French patent application No. 83 03 142, the information which passes over bus 3 each have two information fields, the first, enabled by signal AL (address latch), transports either an address for the direct accessing of DRAM 5 or an instruction which is adapted to be interpreted by VDP 2. The second field enabled by the signal EN (enable) contains data which traverses the bus in one of two directions, the direction being determined by signal RW (read/write). With the first field, (address for the memory or interpreted instructions), the data can be sent to the memory or can come from it, or can be utilized by VDP 2 placing it in one of its two processing configurations.

DRAM 5, in the system here described, is a composite memory having a plurality of zones, addressed starting from a base address. This memory is composed of at least a page memory *5a*, memories for the control of lines and columns *5b* and *5c* (see, in this regard, the patent application filed the same day as the instant application in the name of the instant applicant for a "Display System for Video Images on a Screen by Line by Line and Point by Point Sweeping), at least one zone memory *5d*, at least one form memory *5e*, typographic character memories *5f*, a buffer memory *5g*, which adapts the various processing speeds to each other, in particular, that of central processing unit 1 and external channel 9 (see, in this regard, EP-A N0. 00054490), and, optionally, a memory *5h* programmed in assembly language, for CPU 1, etc.. All of these memory zones can be accessed by the internal units of VDP 2 and by CPU 1, these accesses being controlled either by the CPU 1 itself or by the device for dynamic access to memory 15 (see, in this regard, FR No. 83 06 741). In order more easily to understand following description, it is useful briefly to review the operation of DMA circuit 15.

This circuit distributes access times to DRAM 5 depending upon the priority of the users of the system, that is, CPU 1 and the various units of VDP 2. DMA circuit 15 can be requested by each of these users to access the memory, either in a single cycle (monocycle) or in a series of consecutive accesses (multicycle). In this latter case, DMA 15 can control a particular number of accesses to the memory by a column access signal (CAS), while utilizing only a single row access signal (RAS). This is particularly useful, for example, when this system prepares the display of an entire page on the screen, and it is necessary to access a very large number of memory positions, which are contiguous, and in regard to which, it is only necessary to increment the column address each time by a single unit, with the row address remaining the same for all accesses of this row. It is to be noted that all access procedures of memory 5 are determined by DMA circuit 15.

There will now be examined in more detail the schematics seen in FIGS. *2a* and *2b*.

Interface 7 selectively connects CPU 1 to VDP 2 for indirect accessing, or to DRAM 5 for direct accessing. It is capable of interpreting each address field.

Figure 3:
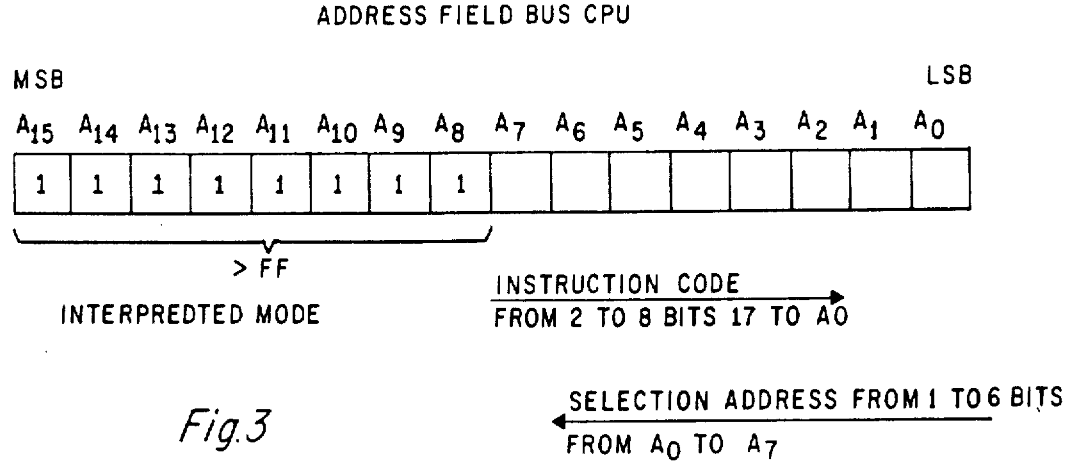
FIG. 3 is a diagram showing the address field which circulates over the central processing unit bus.

FIG. 3 shows an example of the 16 address field distribution with 16 bits. When the field value is between (in hexadecimal) >0000 and >FEFF, this is a direct access to DRAM 5; however, when this value is between >FFOO and >FFFF, the field is interpreted as an instruction enabling the registers for writing or reading via a vis the consecutive data field.

In this regard, the interface includes decoder 16 connected to bus 3 and having 16 outputs, 4 of which, namely, those corresponding to the two least significant bits, are used to enable the four registers of the interface. These registers are:

Address transfer register 17 enabled by signal ENCPUA.

A data transfer register 18 enabled by signal ENCPUD.

A state register 19 (status) enabled by signal ENST.

A control register 20 enabled by signal ENCT.

These four registers are controlled for reading and writing by signal R/W (for writing R/W=0) which is applied to their corresponding control inputs.

Consequently, when there is a direct access to CPU 1, decoder 16 generates address transfer signals ACLPU and ENCPU. For writing (R/W=0), the consecutive data field is transferred to register 18 while, for reading (R/W=1), the contents of this register are transferred at the cycle end on bus 3 so that CPU 1 can access the corresponding data read in DRAM 5. Decoder 16 also includes an output REQCPUF which requests, in DMA 15, an access cycle to DRAM 5. This output is connected to DMA 15 to allocate a memory cycle (signals RAS and CAS) to CPU 1. This cycle provides for transfers between CPU 1 and DRAM 5 over bus 6.

In the second case, if the address field has a value between >FF00 and >FFFF, the field is interpreted as an instruction.

These instructions can be principally divided into two groups called foreground instructions and background instructions, respectively abbreviated as FG and BG.

It has been seen that, among the interpreted addresses, four addresses selectively designate the four register 17 to 20 of interface 7. For this, the last two bits of the address field can be used according to the following truth table:

| | | | |
|---|---|---|---|
| RCTL | WCTL | 00 | Register 20 |
| RST | WST | 01 | Register 19 |
| RCD | WCD | 10 | Register 18 |

-continued

| | | | |
|---|---|---|---|
| RCA | WCA | 11 | Register 17 |

(R designates a read signal and W a write signal).

The other instructions resulting from an interpreted address, which are 256−4=252 in number, with the least significant 8 bits of the address field (FIG. 3), are adapted to execute cycles FG by register FG 21 which is a part of interface 7 and which is connected between certain outputs of decoder 16 and address processor 10 and to the address inputs of read only memory CROM 22 which is a part of this processor.

Register 23 of interface 7, called register BG, is loaded with instructions BG when it is designated by an address field, the interpretation of which calls upon one or several BG cycles. The designation of this register is made by the three least significant bits of the address field and, specifically, when these bits have the value 111. (Address field >FFO7). When register BG 23 is selected, the consecutive data field contains a 16 bit instruction which places the VDP into a configuration for the execution of a large number of memory cycles under control of DMA circuit 15, these cycles being processed successively unless the instructions FG interrupt this process. In this case, the DMA allocates one or FG cycles which are executed and then cycles BG are resumed where they had been interrupted, the process of interpretation as a function of the access priority to the memory being described in the above cited patent application No. 83 03 143.

The address processor, besides memory CROM 22, includes two register stacks 24 and 25 called NRAM and PRAM which are loaded and read in 16 bits via transfer register 26 connected to time sharing bus 6. Each stack is connected to arithmetic and logic unit ALU 27, which is itself connected directly to bus 6 by transfer register 26 and to two 16 bit buses 28 and 29, N and P. The address processor is used principally to provide and calculate all of the address generated by the VDP for accessing memory 5.

Memory 22, when it is addressed by a part of the instruction contained either in register 21 FG or in register 23 BG, selects a microinstruction here stored to enable one or more registers of stacks 24 and 25, an arithmetic or logical operation in ALU 27, and transfer by register 26. The operations of ALU 27 are controlled by five bits of the microinstructions which can select the remainder (Cl=0,1, or 2) and an addition or subtraction operation on bus P or N, 28,29, or between these two buses.

Control memory CROM 22 also provides the signals for controlling the other units of VDP 2 for the transfer of data and addresses between the various buses and registers. The microinstructions addressed in CROM 22 are enabled in time sharing by DMA 15 on line 30 for establishing a relative priority order for memory accessing. In the case here discussed, six priorities are established in the order:

1. CPU - FG
2. External path (didon 9)
3. Display control
4. Display (display processor 16)
5. Reload memory 5
6. CPU BG.

Figure 4A:
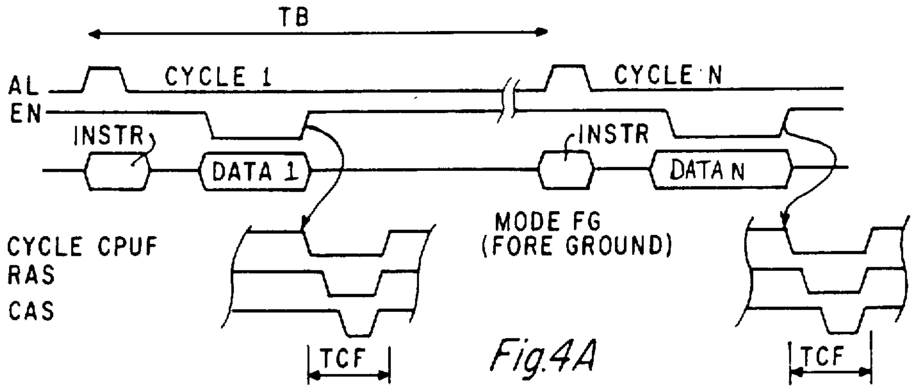
FIGS. 4a and 4b are timing diagrams illustrating the operation of the foreground and background modes assigned to information from the central processing unit.

From the above it is seen that the foreground cycle FG is used by CPU 1 for direct access to the memory, or to access the internal registers of VDP 2, for exchanging, with the memory, a single 16 bit word at a time. This is illustrated in FIG. 4*a*.

Figure 4B:
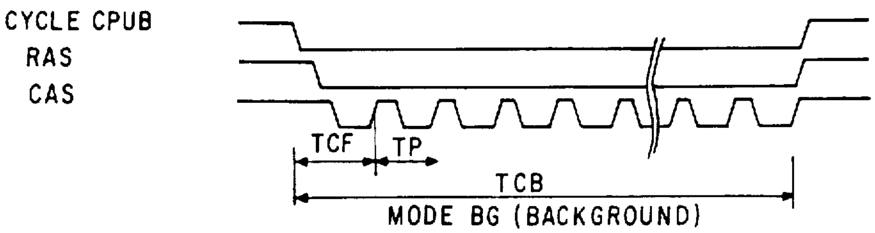

Background cycle BG is executed with a lower priority, that is, when VDP 2 does not have other cycles to execute for other users. The BG cycle is started either by the CPU by cycle FG (FIG. 4*b*), or by VDP 2. When it is the CPU which starts such a cycle or group of cycles, there can be, for example, a displacement of a group of words in memory 5, this operation being executed without the CPU intervening again after the cycle FG, so that the CPU can continue to process FG during the execution of the BG cycles, all of this being controlled by DMA 15 in the established priority (in this case there will be an interruption and then a restarting of the execution of the BG cycles).

The considerable advantage of this arrangement is that various users can work and communicate at their own speed, without being interferred with by other users, the DM effecting the appropriate priority in all cases.

Interface 14 of DRAM 5 includes two transfer registers 31 and 32 controlled by the signals provided by the microinstructions of memory CROM 22 and by signals RAS and CAS from circuit DMA 15 to transfer the data and address fields of bus 6 to the DRAM or vice versa. The data can also be transferred directly into memory 5 from bus 13 to addresses transferred over bus 6 and register 32 from address processor 10.

There will now be described the various operation modes of the system according to the invention with reference to FIGS. 5 through 9. Thereafter, FIGS. 10 through 24 will illustrate a certain number of concrete examples of information processing and the exchange between various units of the system.

In FIGS. 5 to 9, data and addressing streams are indicated by arrows.

Figure 5:
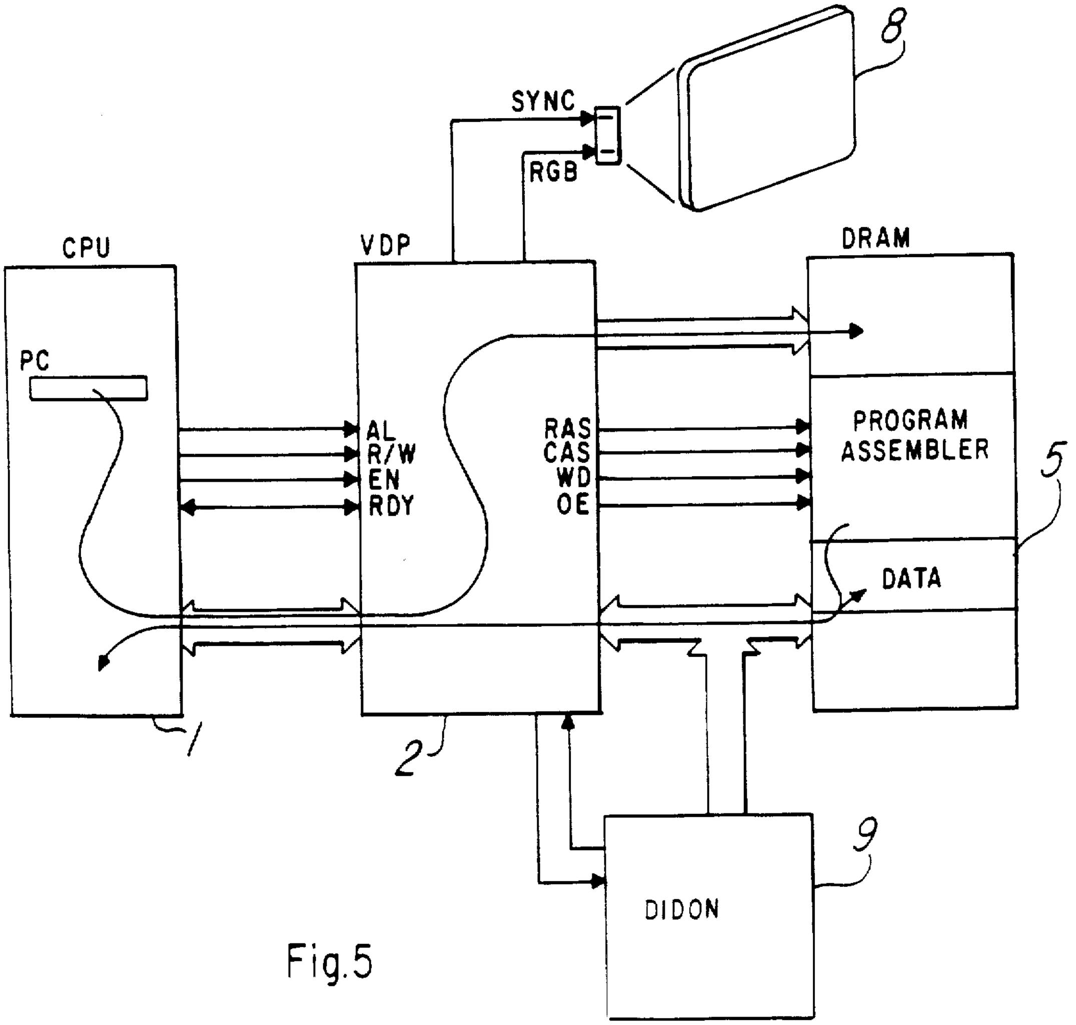
FIGS. 5 to 9 are much simplified diagrams of the system according to the invention illustrating circulation of the address and data information in the various system configurations.

FIG. 5 shows direct access to DRAM memory 5 without utilizing the 256 instructions of the address field reserved for the VDP. This operation mode allows the CPU directly to execute a program written in assembly language or directly to access the data contained in DRAM 5.

Figure 2A:
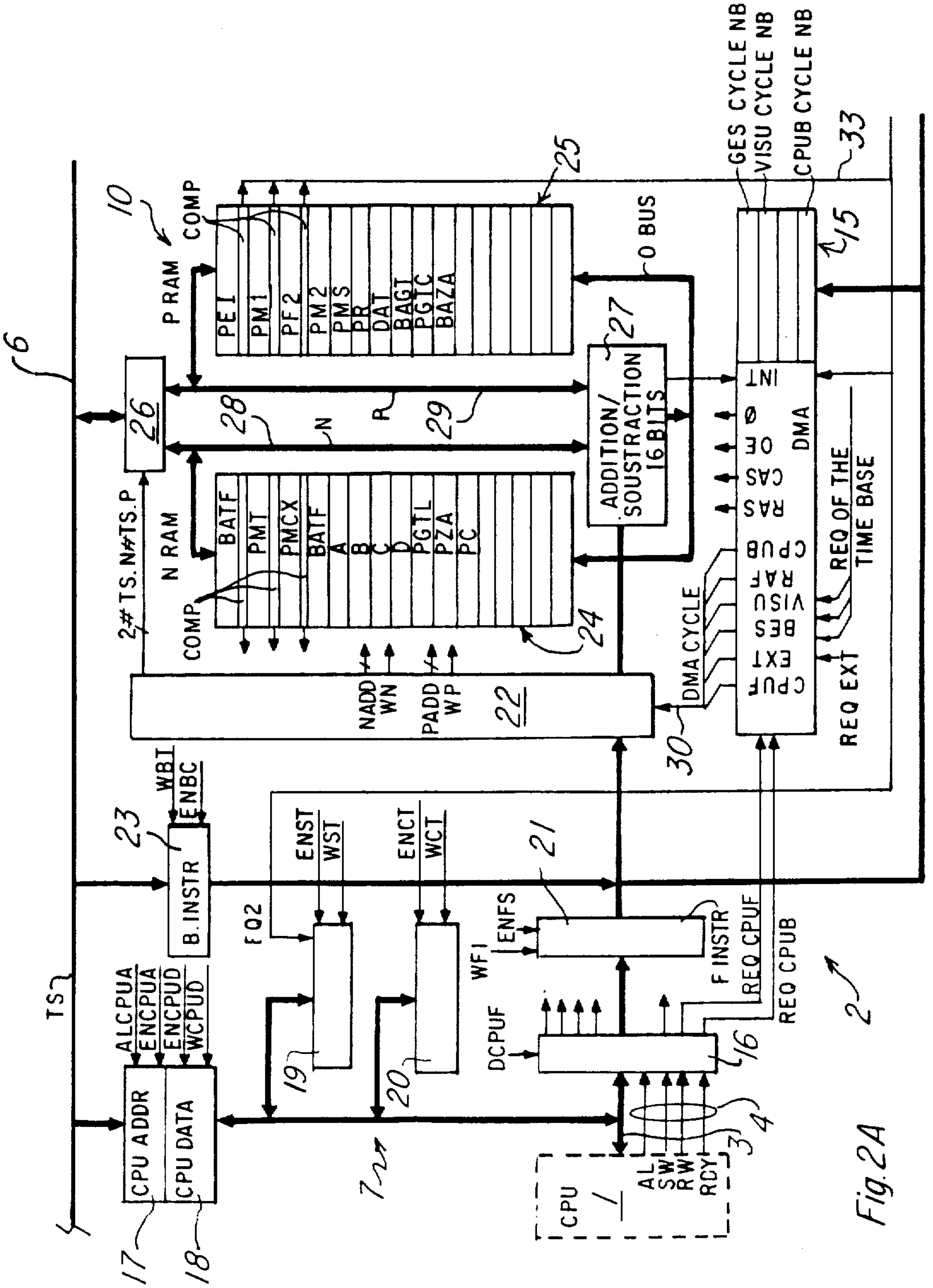
FIG. 2a and FIG. 2b are more detailed schematics of this system.

The access address comes directly from address registers of CPU 1 which starts its cycle as if DRAM 5 were directly connected to the CPU bus. The access cycle of DRAM 5 is directly generated by DMA cicuit 15, FIG. 2*a*, by decoder 16 and signal REQ CPUF, the path selected being that of the highest priority (cycle CPUFG).

Figure 2B:
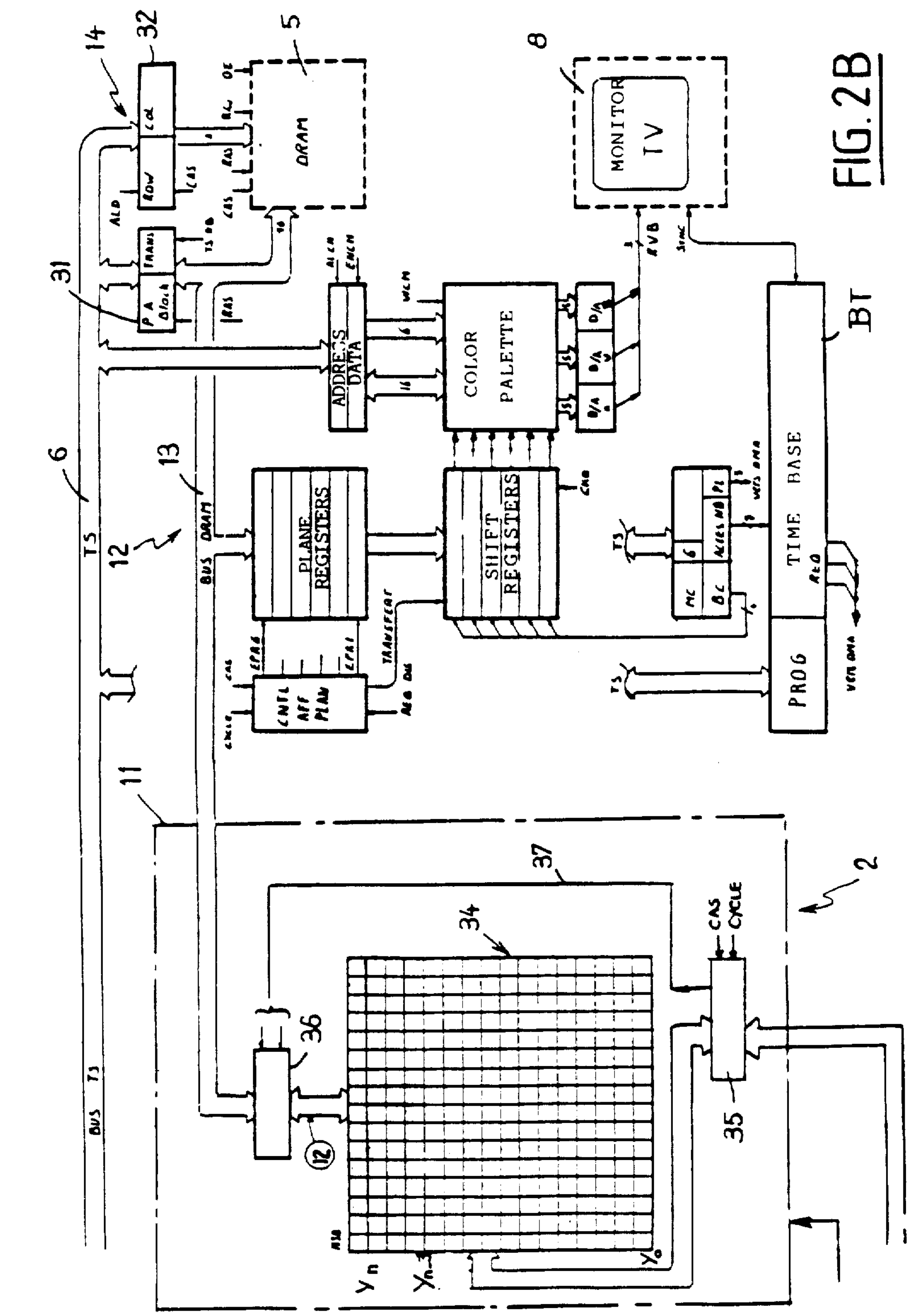
Figure 6:
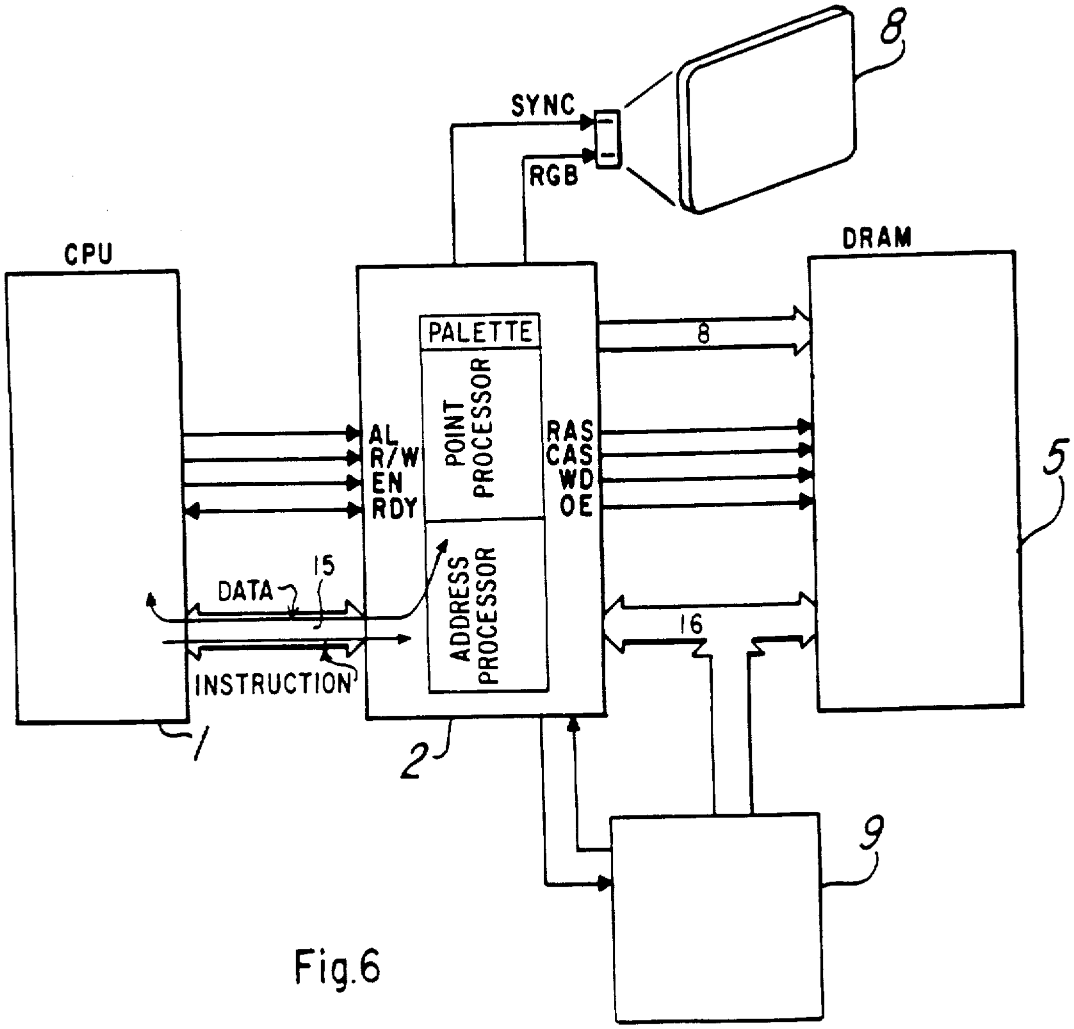

FIG. 6 illustrates access by CPU 1 to registers of VDP 2. The reserved field of 256 addresses in the address field is interpreted as an instruction for VDP 2 and allows accessing for reading or writing to all of the internal registers of the VDP. CPU 1 can thus prepare for future accesses to the DRAM (executed, in particular, in BG cycles) by loading the registers of the VDP with the pointer values, the address increments, the comparison addresses, etc.. It is also possible to program the parameters of the time base BT (FIG. 2*b*), for example to adapt them to the television norms to be utilized, the base colors of the color palette of the display processor 12, and others, in order to prepare an image to be displayed on the screen for initializing the VDP at the start of operations.

Figure 7:
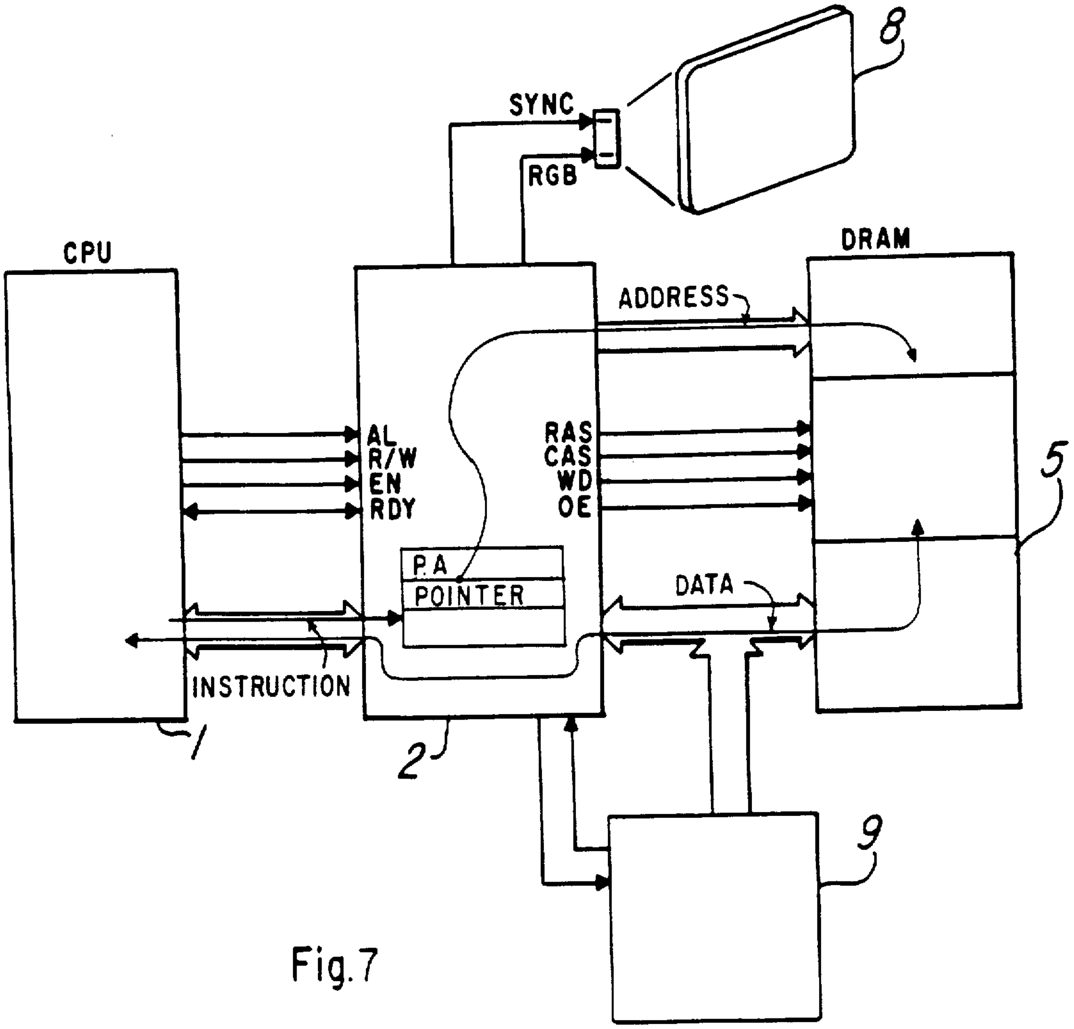

FIG. 7 illustrates an indirect access mode to the memory by a pointer of address processor 10. Certain instructions of VDP 2 (interpreted address field) access DRAM 5 utilizing these pointers. The instruction interpreted by decoder 16 selects a pointer by CROM memory 22 (FIG. 2*a*) which contains the access address to DRAM 5. During the execution of the cycle, the address processor 10 calculates the next access address as a function of the interpretation of the instruction code and the incrementation paramaters which are programmed by the CPU.

In writing, the data sent by CPU 1 is loaded into DRAM 5 at the selected address. In reading, the value read in the DRAM at the indicated address is transferred at the end of the cycle on bus 3 to CPU 1.

This access also uses the path CPU-FG of DMA circuit 16.

Figure 8:
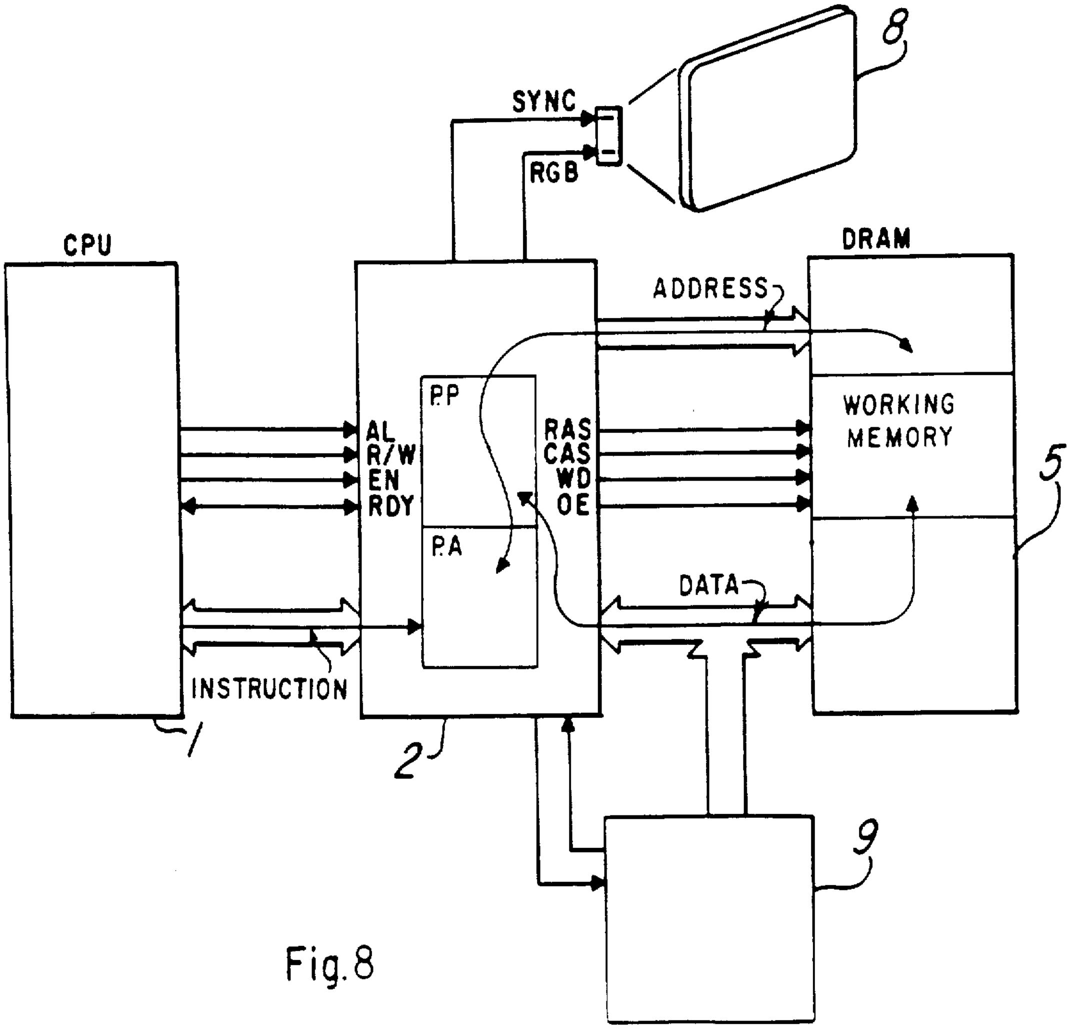

FIG. 8 illustrates access in the BG mode (background).

In these three cases (FIGS. 5 to 7), each instruction or access processes a single word of 16 bits in a monocycle utilization. For example, to copy or transfer a block of 16 words of 16 bits, the code of the instruction generated by CPU 1 must be repeated 16 times.

The access mode BG executes instructions relating to a series of words by generating, by means of CPU 1, only a single instruction. For example, one can load 10 words of 16 bits with a constant value, or with a frame contained in the point processor 12, or one can displace a memory zone to a different address, by means of a single instruction FG ordering a BG procedure.

Before executing the instruction, the parameters must be loaded into VDP 2.

Instructions in the BG mode are executed with the lowest priority, that is, all of the accessing request of a higher priority interrupt their execution.

Generally, instructions utilize point processor 12 to effect data transfers.

It is recalled that the operation mode BG allows the increasing of the image processing speed and reduces the work load of the CPU.

Figure 9:
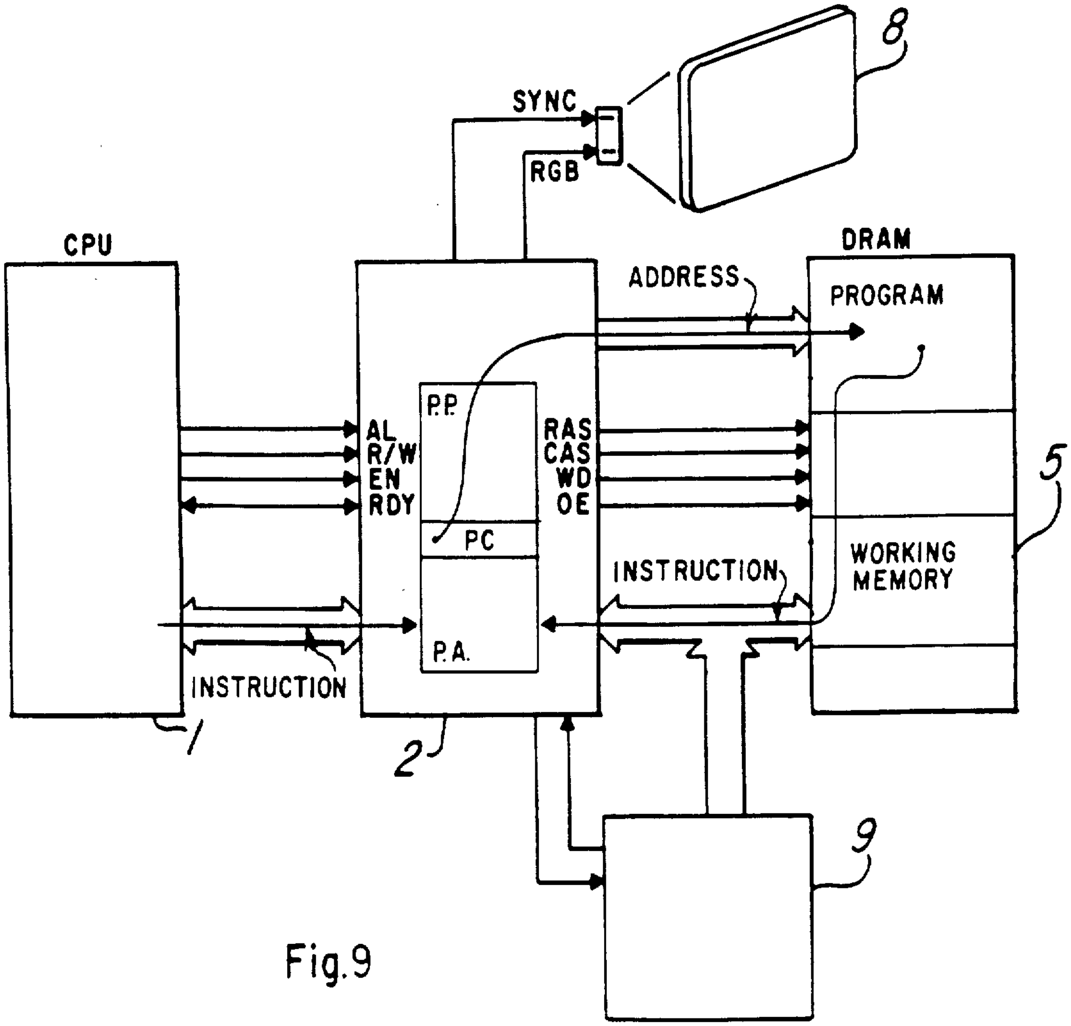

FIG. 9 shows another possibility obtained with a particular arrangement of the inventive system. In the preceding cases, each instruction, which executed operations of several cycles, was generated by CPU 1. Be each execution, new instruction parameters must be generated and loaded into VDP 2 by this CPU. The program execution mode VDP (task) illustrated in FIG. 9 executes a program in VDP language directly under control of address processor 10. For this, a program is preloaded into DRAM 5 by CPU 1 or is contained in program library zones, or in a ROM in one portion of system memory 5 which the CPU can call upon (this portion not illustrated in the figures).

An instruction code generated by the CPU transmits, to VDP 2, the program start address and the execution commencement order.

The address processor obtains VDP instructions from program pointer PC and successively executes BG type instructions.

These programs or tasks can be called upon to execute operations which occur often in the system control. They allow the obtainment of a considerable time saving and reduce the CPU load.

Other ways of accessing DRAM 5 are possible, particularly by the external path (FIG. 9), or by the time base for display. These modes are not described in detail here There will now be examined FIGS. 10 to 11 which show a specific example of direct access of DRAM 5 by CPU 1. As mentioned above, such an access commences when the contents of an address field on bus 3, enabled by singals AL, EN, and R/W is between >0000 and >FEFF. Circuit DMA 15 controls such as access.

Figure 10:
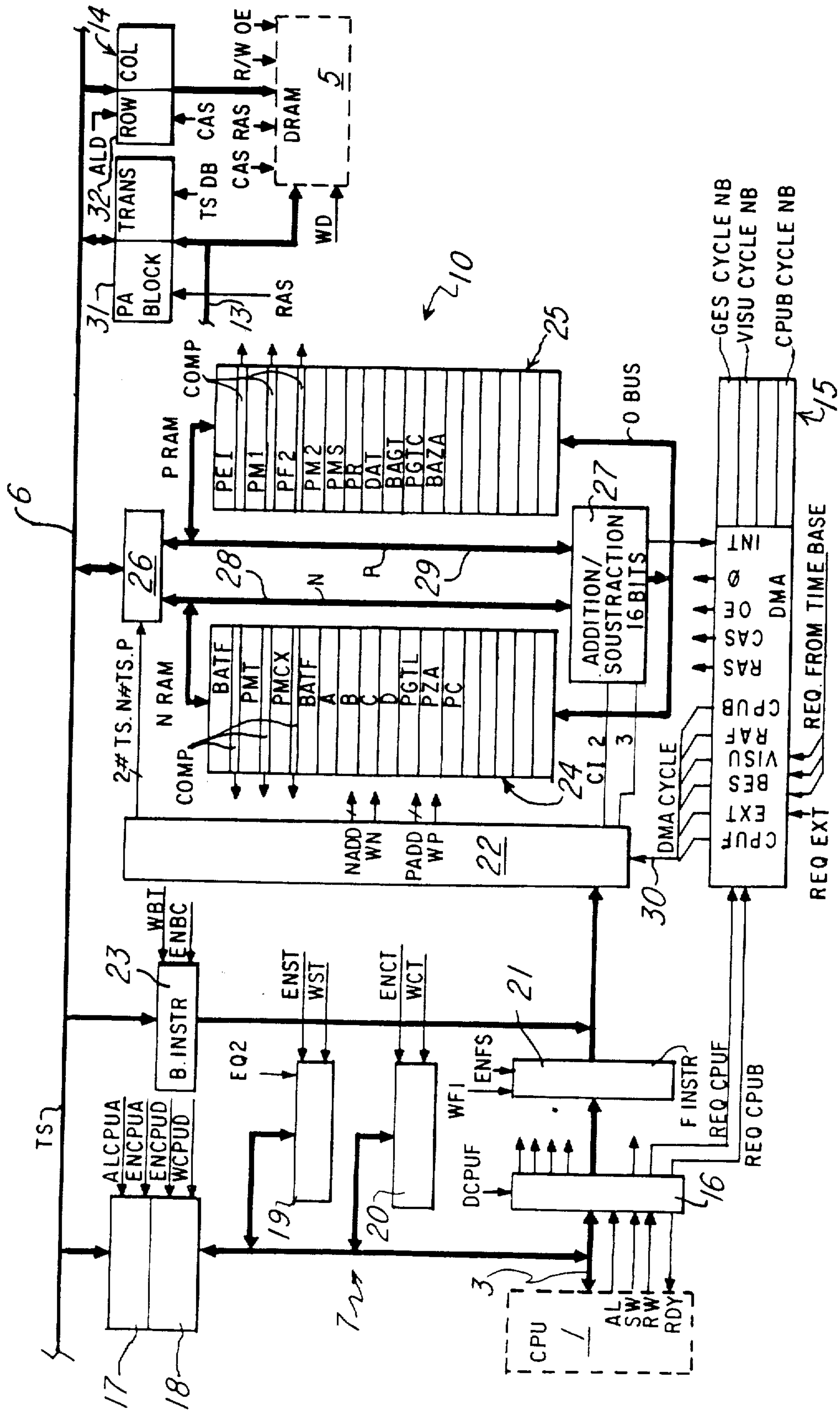
FIG. 10 illustrates direct access of the central processing unit for writing data into the general system memory.
Figure 11:
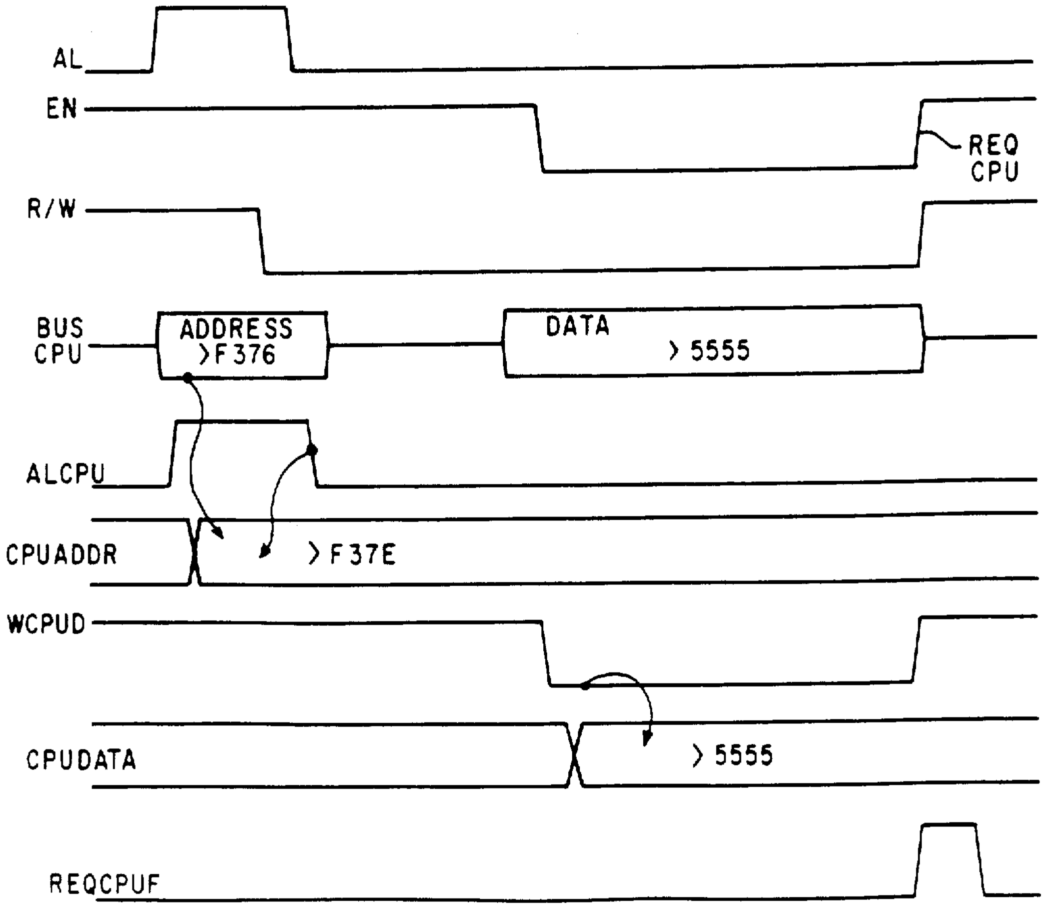
FIGS. 11 and 12 are time diagrams illustrating the operation of the direct access represented in FIG. 10.
Figure 12:
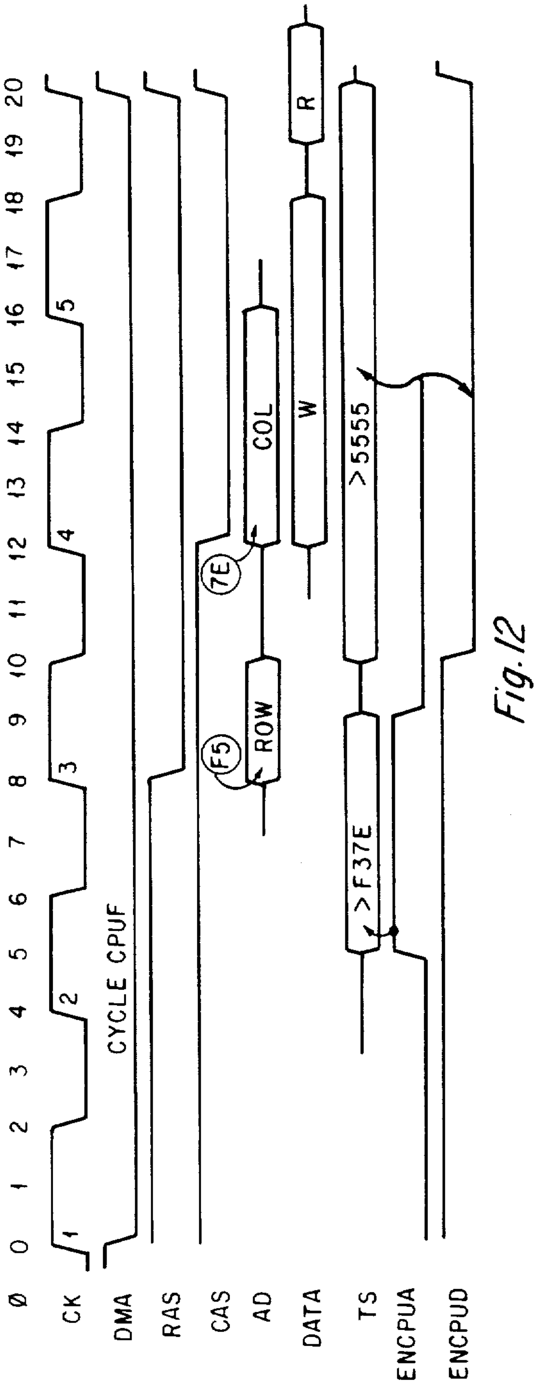

In the example of FIG. 10, the value >5555 is written at address >F37E. This operation procedes as follows.

Signal AL, which accompanies the address field on bus 3, generates signal ALCPU by decoder 16 for address register 17 to which address F37E is therefore transferred. Decoder 16 also generates signal, WCPUD, which is applied to register 18 upon the appearance of signal EN (enable), the signal R/W controlling writing at its lowest priority. This transfers the address field into register 18 (>5555). At the end of this transfer cycle which is controlled by CPU 1, decoder 16 generates signal REQCPUF which is applied to DMA circuit 15 so that a writing signal FG will be selected in memory 5 with the highest priority.

From this, the operations which follows are now controlled by DMA circuit 15 at its own clock rate (signal 0, FIG. 12) after cycle DMA in process has terminated. That is to say, if the DMA circuit is controlling a sequence of BG cycles or is occupied with another sequence having a lower priority, this sequence is interrupted and is not restarted until cyle FG is terminated.

A group of bits of the address field transmitted by decoder 16 and register 21 constitutes a selection address of a microinstruction contained in memory CROM 22, which enables the registers required for writing in memory 5. The microinstruction is itself enabled on line 30 by DMA circuit 15 (signal DMA, cycle CUPF, FIG. 12). The signal ENCPUA from decoder 16 transfers the contents of register 17 on bus 6, the address being thereafter placed in transfer register 32 by signal ALD and multiplexed to separate the column and row bits. The control signals RAS and CAS provided by circuit DMA 15 load the address into DRAM 5 when the data >5555 contained in register 18 are transferred via bus 6 (signal ENCPUD) and transfer register 31 data bus 13. Meanwhile, memory 5 receives the signal WD controlling writing.

Figure 15:
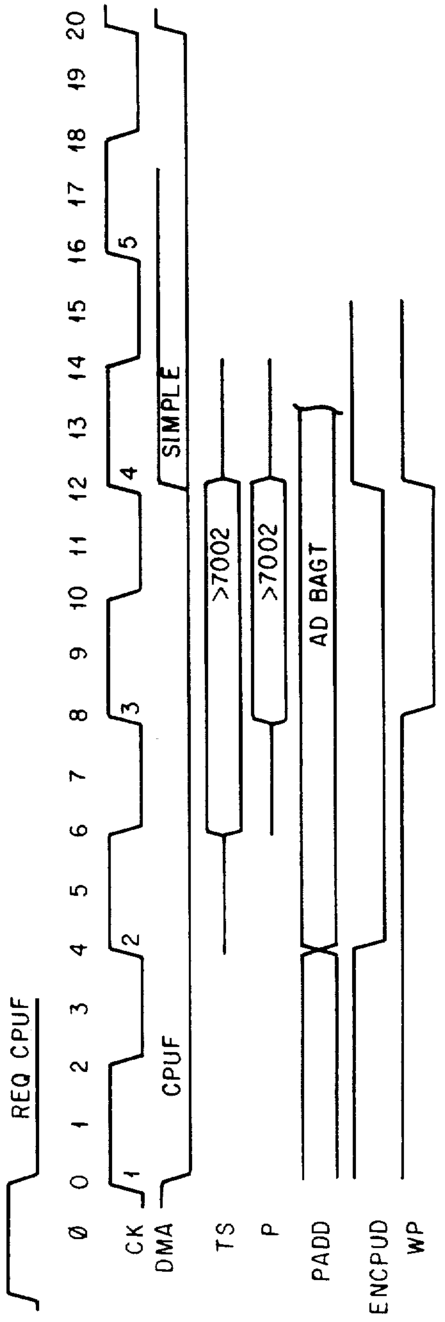
FIGS. 14 and 15 are time diagrams illustrating the operation of FIG. 13.
Figure 13:
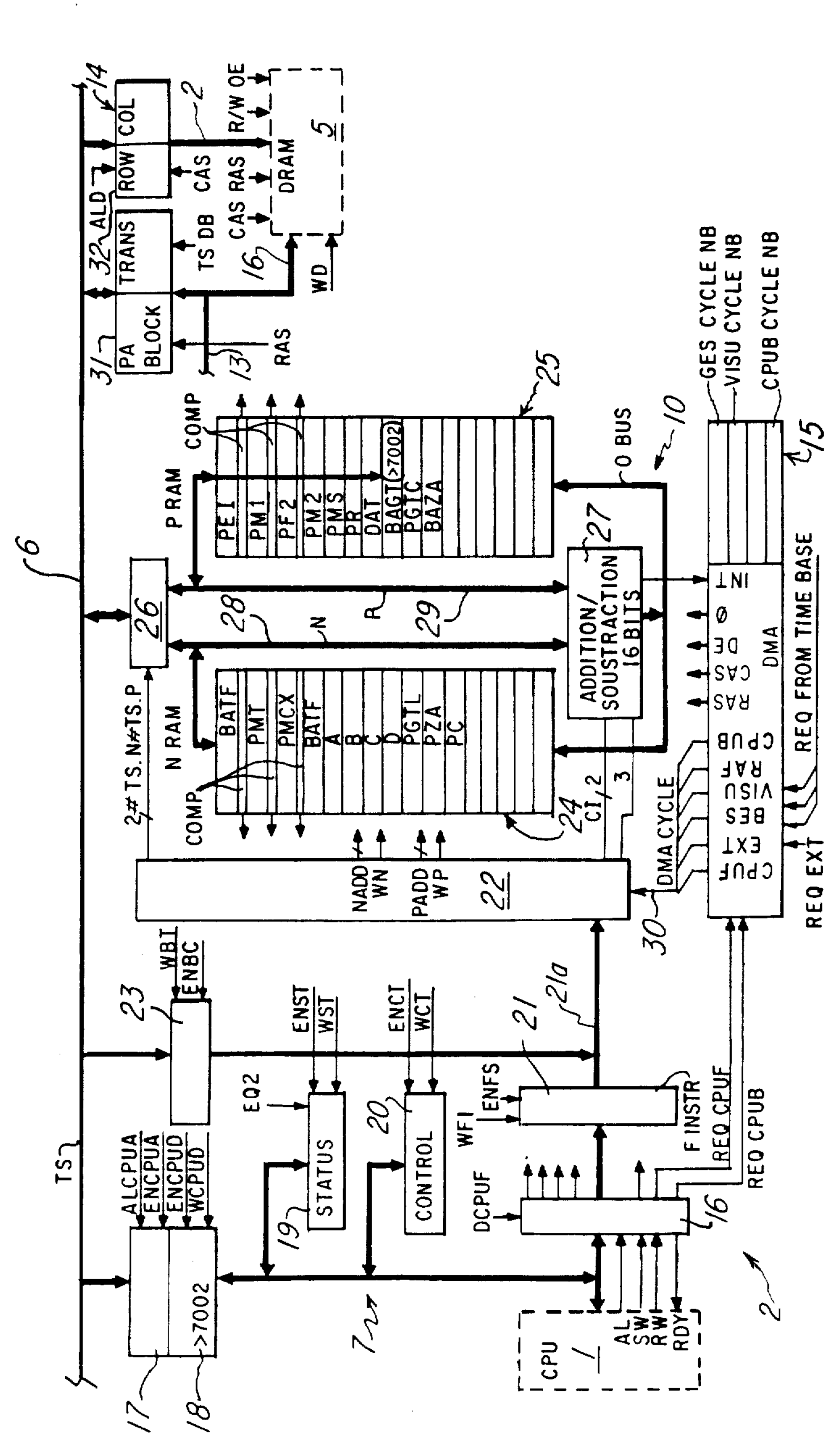
FIG. 13 is a diagram analogous to that of FIG. 10 illustrating the operation of a writing access to the address processor by the central processing unit.
Figure 14:
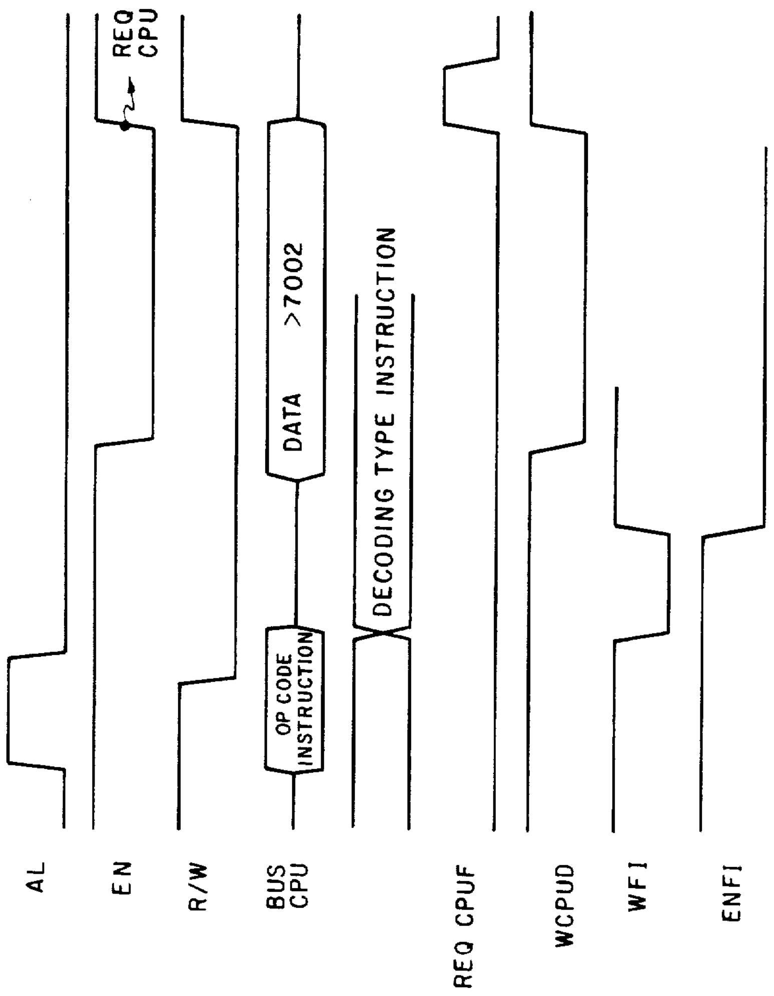

Referring now to FIGS. 13 to 15, there is described an example of writing access to address processor 10. This processor is accessible via bus 6 under control of DMA circuit 15 which will allocate a utilization time following an access request REQ-CPUF. The example concerns the programming of address >7002 into register BAGT, which is a base address pointer of a specific zone of DRAM 5.

The instruction code FG provided by the address field for accessing the processor 10 is as follows:

| A7 A6 A5 OPERATION CODE | A4 . . . STACK N OR P | A3 A2 A1 A0 REGISTER ADDRESS |
|---|---|---|

Of course, the eight most significant bits of the address field are "1" as this is an access with interpretation of the address field.

The signal AL memorizes and enables the address field in decoder 16 so that it can be decoded by the decoder. It is transferred by signal WF 1 into register 21. The instruction is enabled on instruction bus 21*a*, connecting register 21 to CROM memory 22, by signal ENFl. Simultaneously, the consecutive data field at the address (>7002) is transferred into register 18 by signal WCPUD generated in decoder 16 by signals EN and R/W from CPU 1. This data being loaded, decoder 16 generates signal REQCPUF and circuit DMA 15 reserves a cycle for this access request. After having terminated the cycle in progress, circuit DMA applies an enabling signal on line 30 for the microinstruction addressed in memory CROM by the contents of register FG 21.

The microinstruction contains, for example, address PADD and enables, by signal ENCPUD, the transfer on bus 6 of the contents (>7002) of register 18 which are transferred over bus P 29 to be loaded at the address of pointer BAGT by signal WP.

Other registers of stack 25 are loaded in the same manner, while those of stack 24 are loaded by address field NADD of a corresponding microinstruction of CROM 22 obtained from the instruction code of the address field. In this case, the corresponding data are loaded into the pointer selected by signal WN contained in the microinstruction. The above example illustrates that CPU 1 can communicate with the pointers of address processor 10 by a foreground cycle FG utilizing decoder 16 and register FG 21. In an analogous manner, CPU 1 can effect, on the data fields and values loaded into the pointers of stacks 24 and 25, calculation operations by means of ALU unit 27 with bus N and P 24 and 25.

Similarly, it is possible to access point processor 11 and display processor 12, the register of which being enabled by microinstructions addressed in mode FG, by CPU 1.

Figure 16:
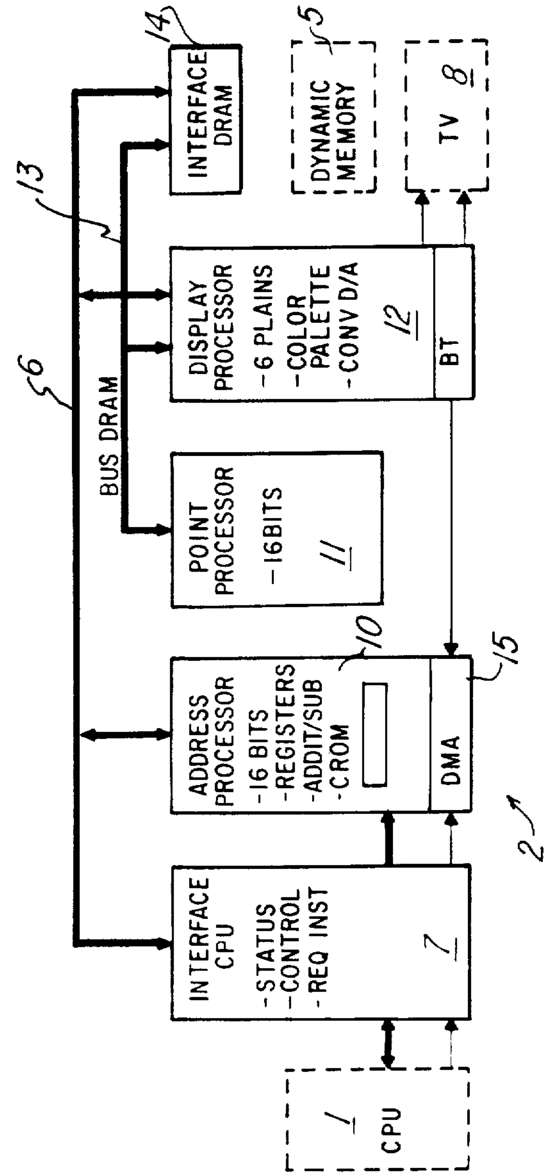
FIG. 16 is a much simplified schematic of a system according to the invention illustrating indirect access of the central processing unit to the general system memory.
Figure 20:
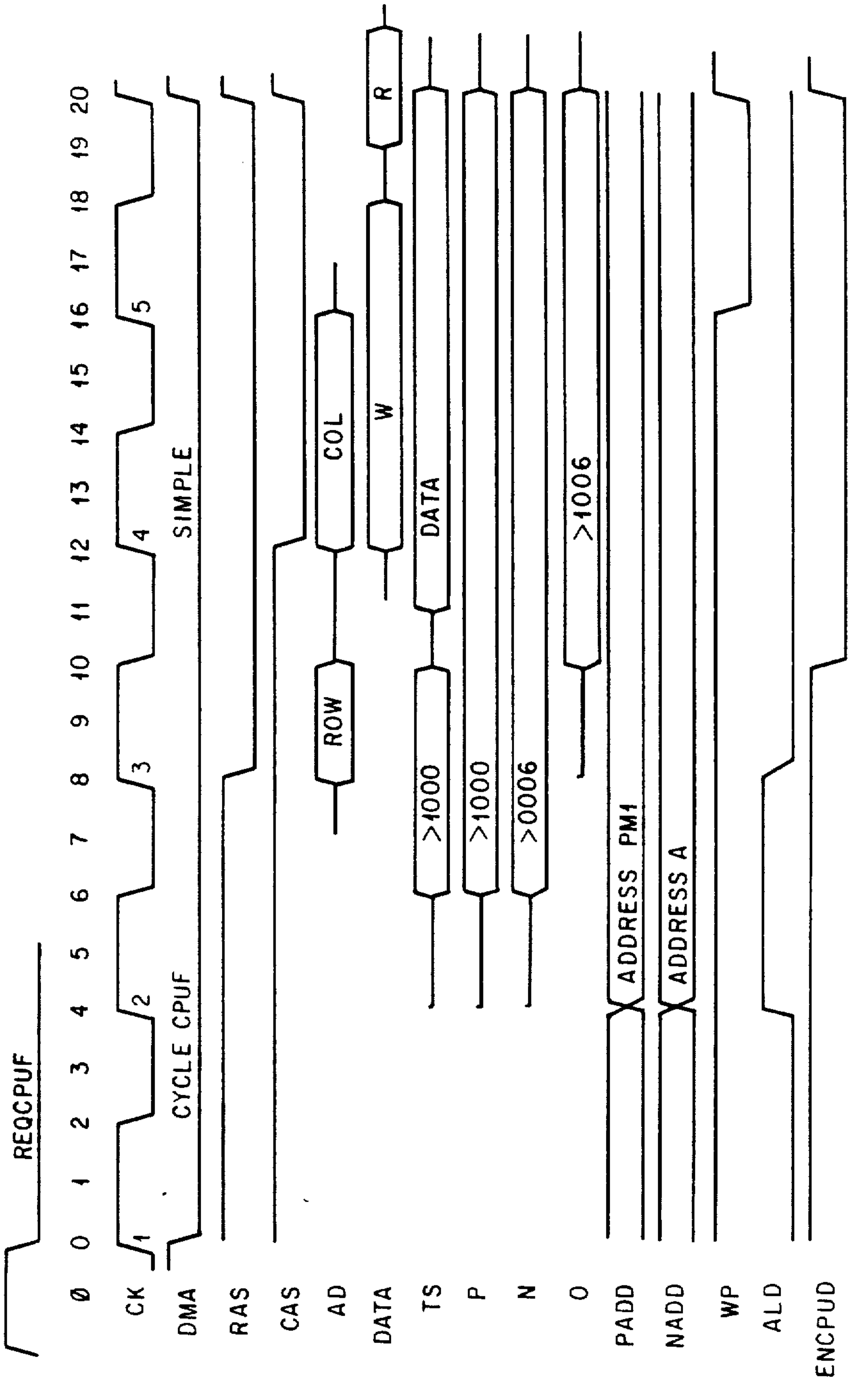
FIGS. 19 and 20 are time diagrams relating to the operation of an access according to FIG. 18.

There will now be described another example of the foreground mode FG in connection with FIGS. 16 and 20. This example concerns indirect access by CPU 1 to DRAM 5, namely, by means of address pointers of processor 10. In this configuration, the pointers have been loaded in advance by CPU 1 with address values with which the system can, in various ways, access DRAM 5. FIG. 16 illustrates the principle of such an indirect address. The address field interpreted as instruction FG commences a request for accessing DRAM 5 utilizing one of the pointers of address processor 10 selected by the instruction code. During accessing, this pointer can be incremented by a value contained in another pointer of the address processor. The address from the pointer transferred to interface 14 selects a word in the DRAM. The corresponding data is transferred for reading or writing between the CPU and the DRAM. The process is controlled in a manner as described above by means of DMA circuit 5.

Figure 17:
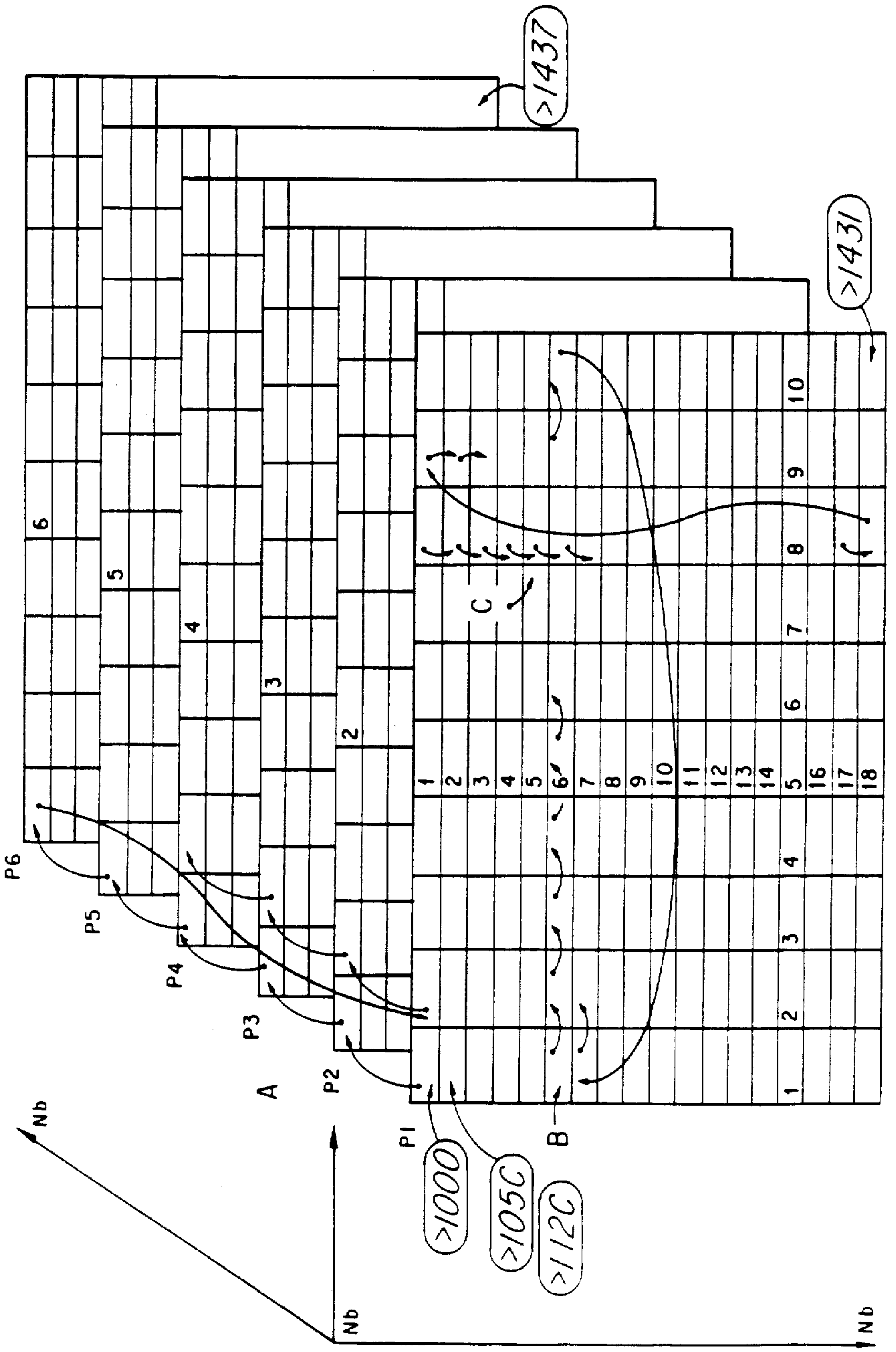
FIG. 17 is a diagram of address progression in a general access of the system memory.

To illustrate indirect accessing, FIG. 17 will first be discussed, this figure representing the organization of a part of memory 5 and, more particularly, that part which contains information relating to an image zone to be displayed (part **5*d* of FIG. 1**).

As described in the above cited patent application FR No. 83 06 741, zone memory **5*d*** is organized in three "axes", namely:

Progression along a line or a row

Progression along a column

Progression "in depth".

Of course, the term "depth" is not used here to designate a third physical image dimension. Progression in depth indicates changing the address of the memory plane to another to allow addressing with the desired color code of the palette memory of display processor 12. The axes are indicated at the left in FIG. 17.

During a depth progression (A), the address is incremented by "1" for each word of 16 bits. In a progression by line (B), the address is incremented each access by the number of planes utilized to define the zone. In a progression by column (C), the address is incremented by the number of planes multiplied by the number of words defining a line. In the example of FIG. 17, a display zone is defined on six planes, each including ten words per line (16×10=160 points) and eighteen lines per column. The address of the start of the zone is >1000.

The six first words of planes P 1 to P 6 are located at addresses >1000 to >1005; they define the color code of the sixteen first points of the first line of the displayed zone. The sixteen following points commences at address >1006. The memory zone will be filled in horizontal layers each including 6×10 =60 words defining a line of the display zone. The following layer corresponds to line 2, commencing at address >103C. For each access, the corresponding pointer of the address processor 10 is incremented by 1.

Progression by line corresponds to composition of the zone plane by plane. The origin address of the pointer determines the plane (P 1 to P 6) in which the VDP 2 operates. For example, to compose the first line of plane P 3, the address of the first word of the line is 1002, the address of the second is 1002+6=1008. The address of the last word of the line is 1037. The first address of the following line in plane P 3 is 103E. For each access, the pointer is incremented by 6.

Progression by column is also effected in the same plane. However, for each access, the pointer is incremented 6 planes×10 access lines=60, that is >3C. If the first access corresponds to plane P 1 at address >1000, the following access is the address >103C and that of line 6 is at address >112C.

Returning to FIG. **2*a*, it is seen that stack P 25 of address processor 10 contains 3 pointers, to which are associated 4 increment values in stack N.24 (pointers A to D). The pointers PM 1 and PM 2 are continually compared with the values programmed into registers PE 1 and PE 2, the result of the comparison appearing in state register 19 of interface 6 which is connected to stack 25 by line 33**.

The interpreted address field >FFEF for the selection of a pointer and its increment is as follows:

| A7 A6 A5 | A4 | A3 A2 A1 A0 |
|---|---|---|
| operation code | . | increment mode selection |
| | pointer selection | |

Pointers PM 1, PM 2 and PM3 can be selected by bits A4 and A3 for all types of access and incrementing. The selected pointer PM1, PM2 or PM3 can be incremented by six values:

PMn+0 or PMn+1

PMn+A,+B,+C, or+D. (A,B,C, and D being here the values loaded into registers A,B,C, and D of stack 24).

The comparators in stack P will indicate equality of the pointers with the values PE 1 and PE 2.

PM 1=PE 1

PM 1=PE 2

PM 2=PE 2

The three equal bits are accessable in state register 19 by line 31.

Figure 18:
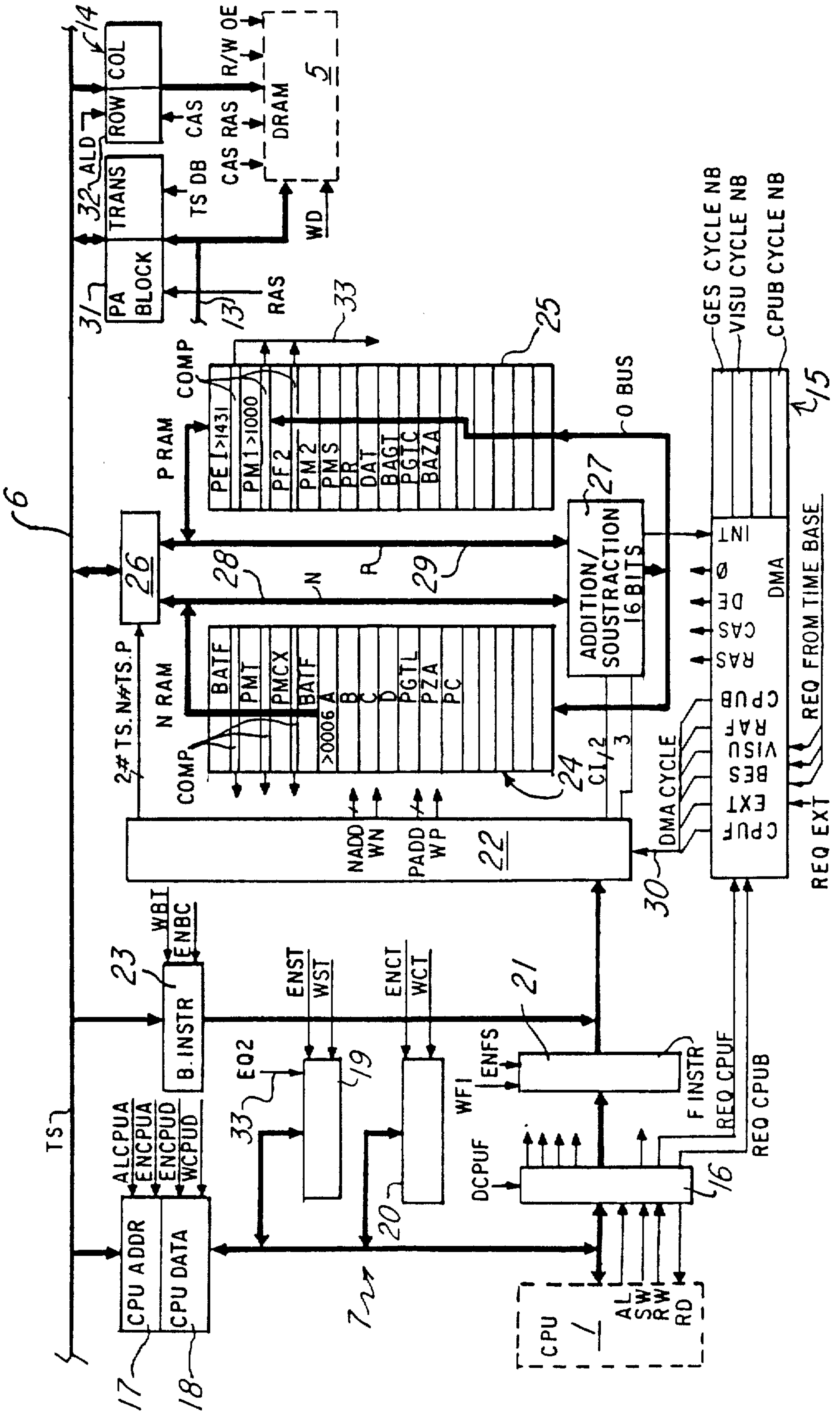
FIG. 18 is a diagram analogous to that of FIG. 10 showing the circulation of information during an access to the general memory in accordance with FIG. 17.

To fill plane P 1 (FIG. 17) with a line progression, the address >1000 is loaded into register PM 1 (FIG. 18), according to the method previously described. The increment value >0006 is loaded into register A. The last address of the plane is loaded into register PE 1=>1431. The first access is represented in FIG. 18 and in the time diagrams of FIG. 19 and 20.

During signal AL, the address field is interpreted and its code loaded into register 21 by signal WF 1, and then enabled at the inputs of memory CROM 22. The data field is transferred into register 18 by signal WCPUD.

At the end of the cycle, the access request REQ CPUF is sent to DMA circuit 15. When this circuit is free, it generates a cycle CPUF which enables the microcode selected by the operation code. The pointer PM 1 is enabled on bus P 29 and on bus 6. The address >1000 is loaded into address multiplexor 32 by signal ALD. The signals RAS and CAS load the address into memory 5 and select the word >1000.

The increment value A=>0006 is enabled on bus N 26. The selected microcode controls ALU circuit 27 for adding the contents of buses P and N; the result placed on bus O is loaded into register PM 1 by writing signal WP. Before the negative transition of signal CAS, signal ENCPUD enables the data on bus 6 which is connected DRAM bus 13 of memory 5. As the writing signal WD is at a low level, the data is transferred into memory 5 at the address >1000. The following access started by the CPU is effected at address >1006. During the same cycle, the microprocessor 10 calculates the address >1006+6=>100C.

At the cycle of the last address of plane >1431, signal PM 1=PM 24 is generated and applied to state register 19. This information is utilized in the FG mode by CPU 1. However, its object is principally the control of the multicycle access BG described below.

From the above operation examples in the FG mode, it is noted that each interpreted access of the CPU 1 corresponds to the execution of a single CPUF cycle (FIG. 4*a*). The time TB separating two access depends upon the characteristics of the CPU and the complexity of its program to be executed.

Certain loading phases of a zone memory of DRAM 5 can require a large number of repetitions of an identical instruction code for, for example, preparing a display plane with a uniform color, or with a frame of points with different colors. The access mode BG considerably reduces the execution time, each access being executed at the speed of the cycle "page" TP (FIG. 4*b*) of the DRAM memory (about 120nS) while the execution speed of mode FG is related to the execution time of the CPU program. The cycle TB duration, seldom lower than a plurality of microseconds, is therefore clearly longer than that of cycle TP of VDP 2.

The instructions BG utilize the multiple access and page mode of the DRAM. The number of successive accesses can cover the totality of the addressing capacity, for example 65,536 cycles. However, two conditions will temporarily interrupt the execution of successive cycles:

An overloading of the address column of DRAM 5.

An access request of another path to DMA circuit 15. The overflow signal INT (FIG. 21) is generated during the calculation of the address of the next access. The cycle in progress is interrupted by the signal CAS. It is followed by a complete cycle which loads the new row address of signal RAS and the column address of signal CAS.

Before executing an instruction in the BG mode, the pointers and parameters utilized by the instruction must be loaded in a mode FG in the address processor 10 by CPU 1. An instruction BG is started by loading register 23 which is done by a CPUF cycle as described above. The address field of the CPU contains the loading instruction code and the data field containing the code to be loaded into register 23.

Figure 21:
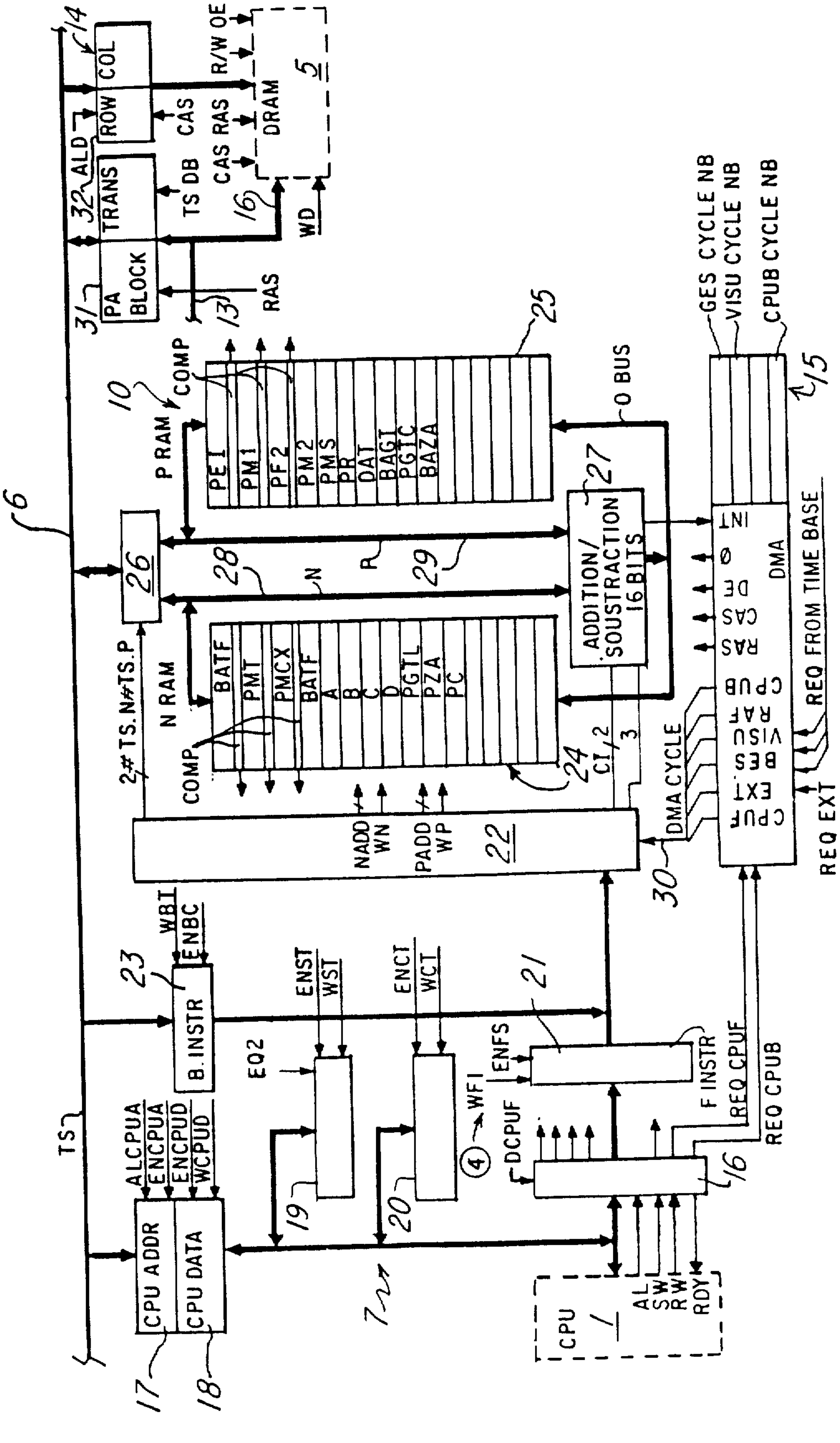
FIG. 21 is a diagram analogous to that of FIG. 10 representing the operation during the loading of a background instruction into the central processing unit interface.
Figure 19:
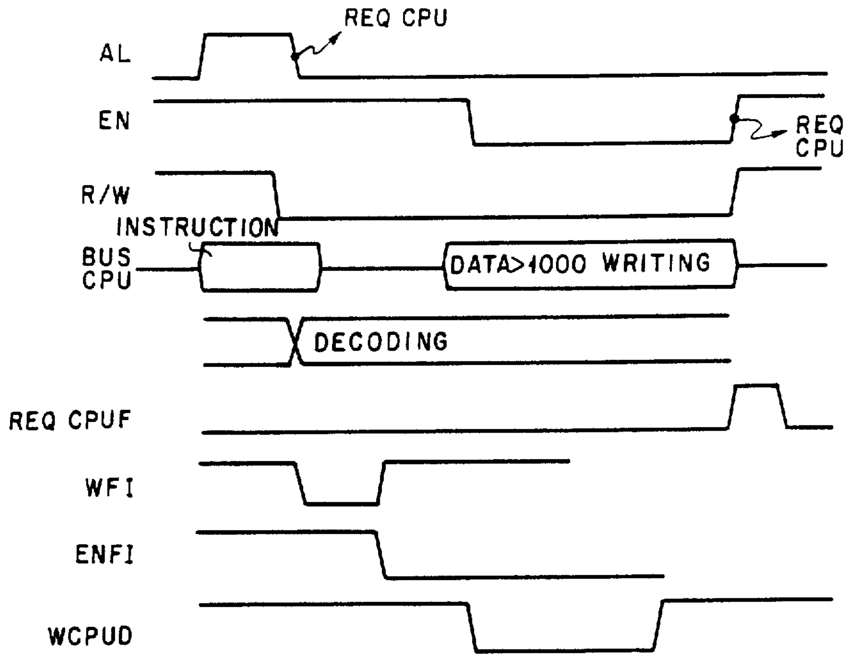
Figure 22:
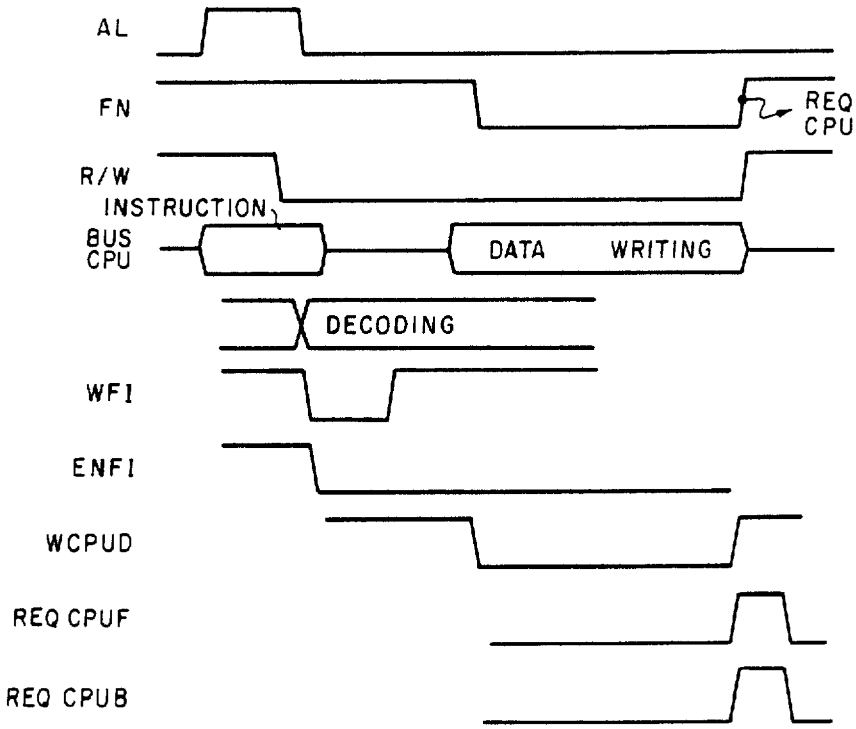
FIGS. 22 and 23 are time diagrams illustrating the operation of FIG. 21.
Figure 23:
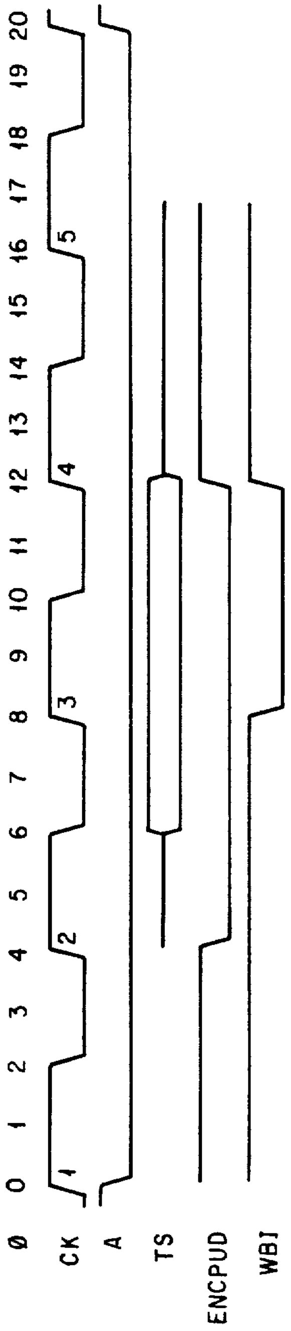
Figure 24:
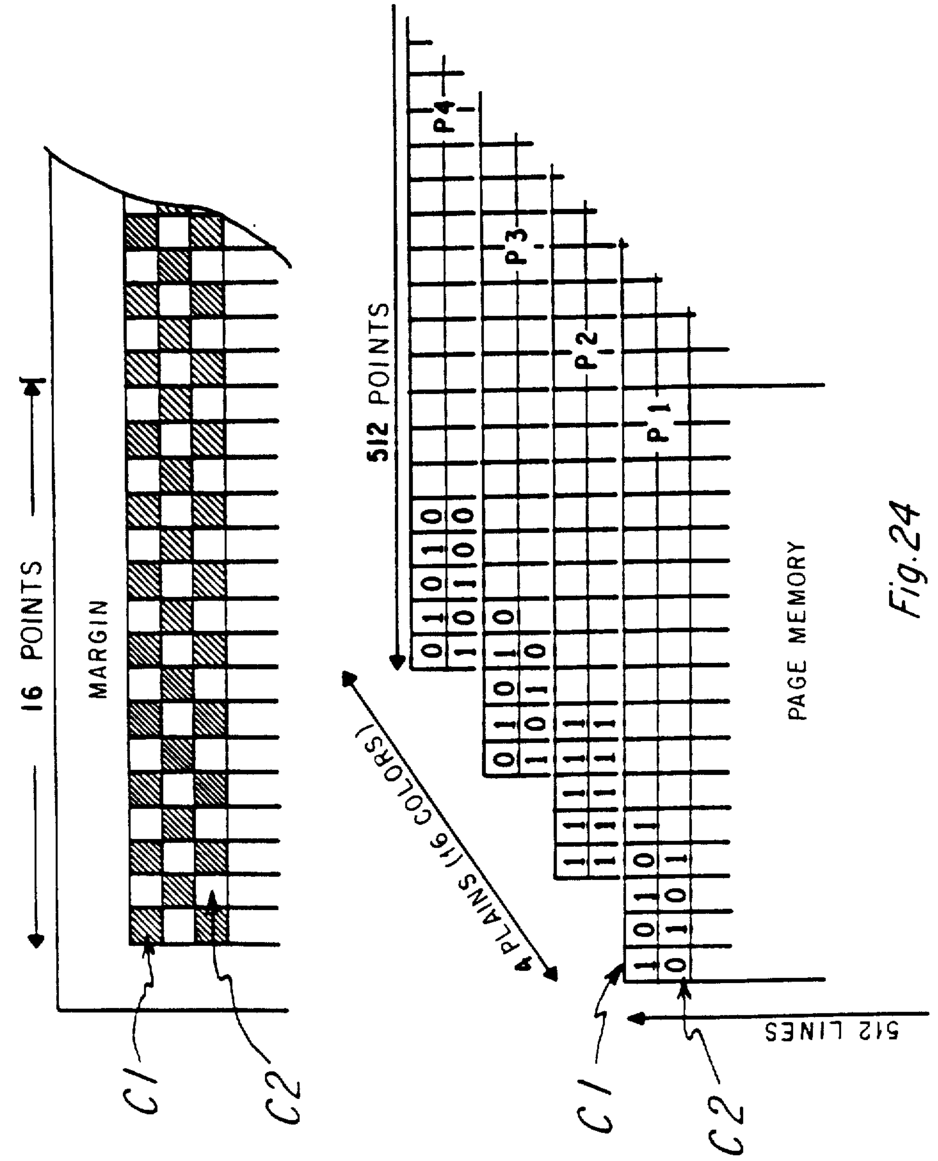
FIG. 24 is a diagram schematically depicting the preparation of the display of an image zone in the memory.

The principle of loading and triggering an instruction BG is seen in FIGS. 21, 22, and 23. The instruction code FG executing the loading of register 23 is transferred into register 21. The data which is the instruction code BG is loaded into register 18 by signal WCPUD. The access request REQ CPUF and REQ CPUB are generated at the end of the cycle by decoder 16. As access request FG has priority, cycle CPUF is first executed. Signal CPUF enables the microinstruction selected in memory 22 which generates signal ENCPUD, transferring the contents of the register to bus 6 which is itself loaded by signal WBI in instruction register 23. The cycle CPUB is started at the end of cycle CPUF.

During the execution of an instruction in the BG mode, CPU 1 does not have access to process the data exchanged between the DRAM memory and other units of the VDP. The addresses are provided by address processor 10. Some instructions can be executed in a plurality of hundreds of memory cycles, the CPU accessing state register 18 to determine the progress status of the BG instruction in the course of execution.

There will now be examined in detail the operation in the BG mode with reference to FIGS. 24 to 27. The example selected consists of initializing a zone of DRAM 5 for preparing the background of the image to be displayed; on the background there can be superposed elements such as text or figures. In the example, the form is a frame of two colors C1 and C2 (FIG. 24) which alternately color and quincunx the points of the screen.

It is assumed that the screen has 512 points by 512 lines, each point being defined in one color among 16. The memory zone must therefore define color information for four planes, each having 512 lines of 32 words of 16 bits. However, in the example, the color code C1 is P1 and P2=1, P3 and P4=0. The color code C2 is P1=0 and P2 P3 and P4=1. In addition, it is assumed that the memorization is effected with a progression "in depth", that is, the first word is loaded into the 32 words making up the first line of plane P1, the second, third, and fourth words are then loaded in the same manner into their respective planes.

Each line contains 32×4=128 words. If the starting address of the zone of DRAM 5 is >0000 (first word of P1), the last address of the line is >007F (last word of P4).

To effect this loading, point processor 11 is used, which processor includes a 16 bit RAM memory 34, the rows of which being addressed by addresses Yn to Yn−3. However, the point processor can have a much more complex structure for carrying out veritable manipulations of the image elements. In such a case, there would advantageously be used the processor described in the patent application filed the same day as the instant application in the name of this applicant and entitled "Point Processor for a Video System for Display by Frame Sweeping Line by Line and Point by Point"

Figure 25:
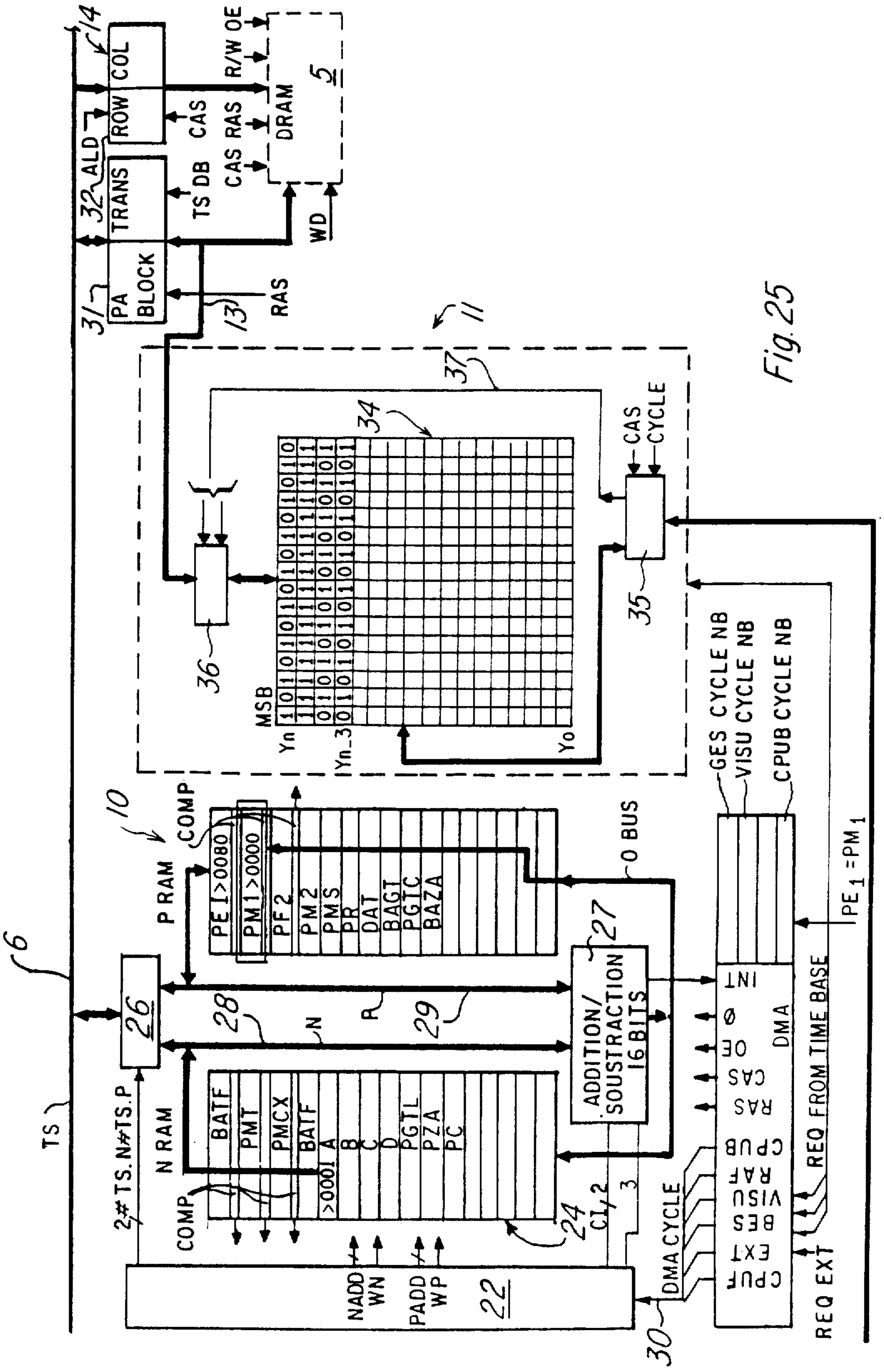
FIG. 25 is a diagram representing a part of the inventive system at the initialization of a memory zone of the point processor.
Figure 26:
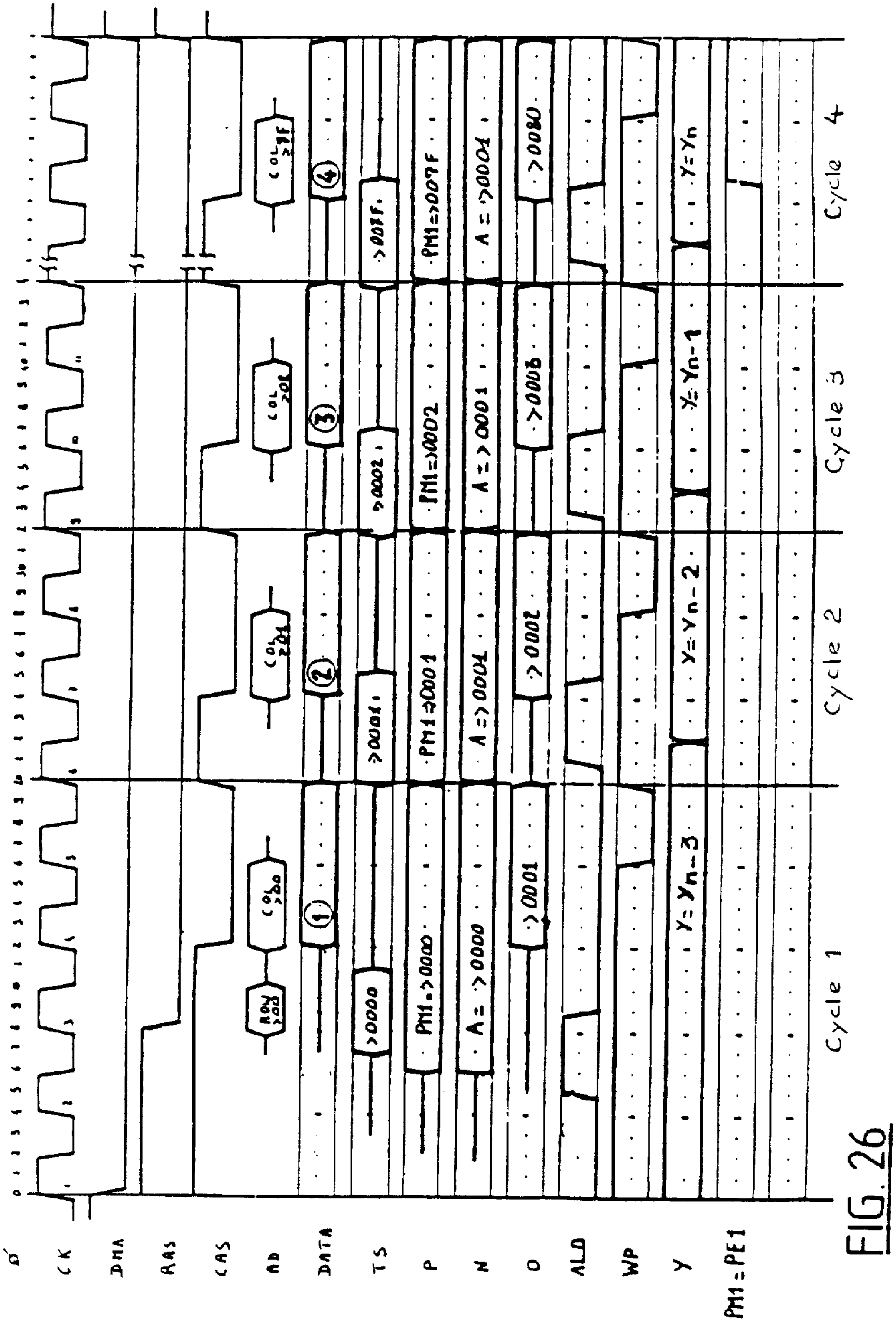
FIG. 26 is a time diagram relating to the operation seen in FIG. 25.

Prior to executing the BG memorization operation on the first four lines processor 11 is loaded with four words of 16 bits at addresses Y0 to Y3 as seen in FIG. 25.

The point processor 11 in this example includes, besides RAM 34, address register 35 for this memory which is loaded in advance from BG register 23 and which counts down its contents by signal CAS. This register also controls transfer register 36 by line 34 for transferring the contents of the addresses of RAM 34 to bus 13 when required.

The instruction BG is loaded into register 23 according to the previously described method. It loads countdown counter 35 to define the addressing limits Yn to Yn−3.

The instruction uses pointer PM1 of address processor 10 which is initialized to the first access address >0000, and the depth progression increment >0001 loaded into register A. The addressing limit PE1=>0080 stops the generation of transfer cycles when PM1=PE1. The request REQ CPUB triggers the start of cycle BG.

The operation code contained in register 23 selects a microcode in CROM 32 controlling the corresponding pointers. The pointer PM1 is enabled over bus P, then transferred over bus 6 to address multiplexer 32 of the DRAM memory. During the first cycle, the address processor calculates the address of the first access by the operation PM1+A. The contents of register A are placed on bus N 38 and the result is transferred over bus O, into pointer PM1 by signal WP. In regard to the point processor, the count-down counter 35 selects the first address Yn. The value contained is transferred over bus 13 over register 36 enabled by the signal on line 37 from count-down counter 35. The data are loaded at the address selected by writing signal WD, which is at a low level during the signal CAS.

The following accesses are successively executed so long as the cycle in progress has not been interrupted by a higher priority request or by an address column overflow.

During the second cycle, only the least significant byte of pointer PM1 is loaded into the DRAM memory by signal CAS. The address processor calculates PM1+1=>0002, the point processor decrements address Y. The second word of the point processor is loaded at address PM1=>0001.

According to the same method the third word of the point processor selected by Y=Yn−2 is loaded at address PM1=>0002. The fourth word selected by Y=Yn−3 is loaded at address >0003.

Figure 27:
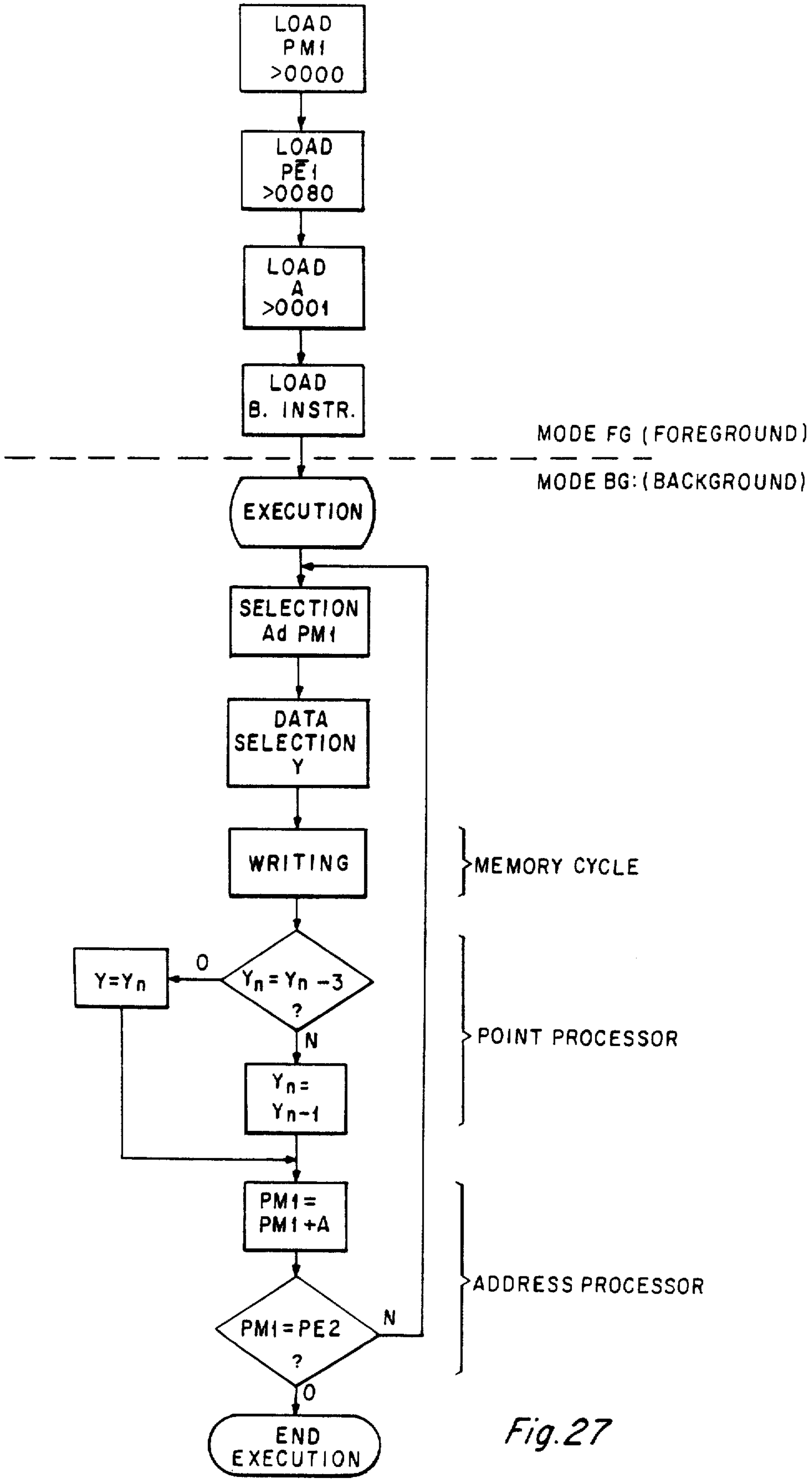
FIG. 27 is a flow chart.

In the following cycle, the point processor being at address Y=Yn−3, the address Yn is reloaded into count-down counter 35 and the transfer continues in a cyclical manner according to the same method. At any moment, PM1 is compared with PE1. When the two values are equal, the signal PE1=PM1 stops the sequence of access at the 128th cycle. A bit of state register 19 indicates the end of execution of the instruction. The execution algorithm of the instruction is indicated in FIG. 27.

The BG mode also reduces, in another manner, the workload of CPU1 consisting of diverse operations called "tasks", is offloaded to VDP2 by means of an instruction program which is loaded in advance into DRAM memory 5.

This "task" mode uses a particular pointer of stack 24 of address processor 10 called the program counter PC. In addition, there is provided a flip-flop 38 for commanding the alternation between loading register BG 23 with an instruction of the "task" program, and executing this instruction in the VDP. The alternation flip-flop 38 is connected by one of its outputs, which has acquisition signal IAQ, to memory CROM 22 for selecting a microinstruction for loading register 23. State register 19 includes a bit which is reserved for the task operation and which changes state when all of the instructions of the task are executed.

A task operation entails the advance loading of an instruction group into DRAM 5. This group is permanently memorized or stored with instructions FG by CPU 1 during operation, for example at the initialization of the system.

Figure 28:
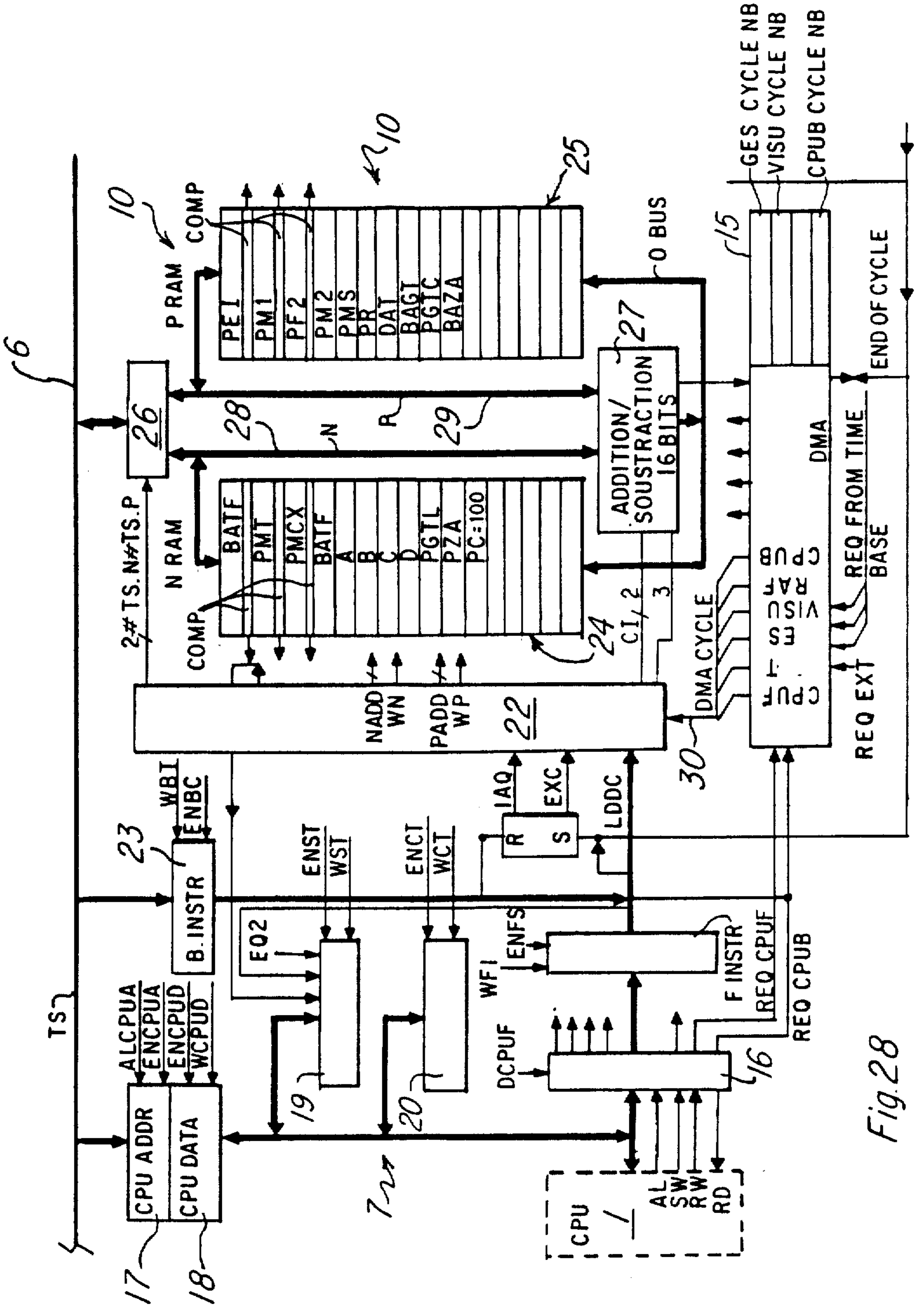
FIG. 28 illustrates the "task" operation mode of the video processor, VDP.
Figure 29:
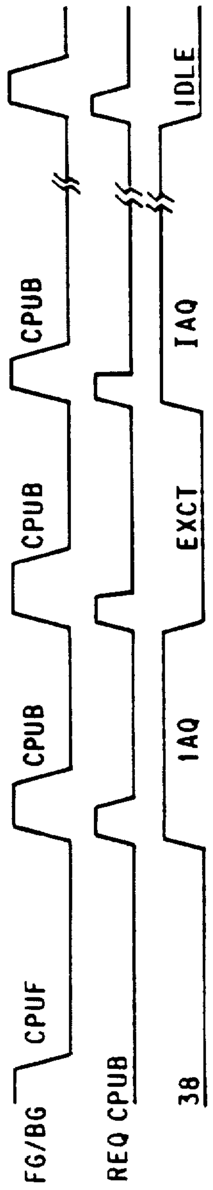
FIG. 29 is a time diagram illustrating the "task" mode.

When this instruction is to be executed, CPU1 loads, into memory PC of address processor 10, the address of the first instruction by a foreground cycle FG (see FIGS. 28 and 29). The instruction FG initializes the flip-flop 38 by a bit LDPC which is applied via decoder 16 and register 21. A signal REQ CPUF is also generated and applied to DMA circuit. The flip-flop, being placed in an acquisition status, selects a microinstruction in memory CROM 22 transferring the data (first instruction of the group) to register BG 23, this data being located at the address in register PC. Meanwhile, the address processor increments the register by a unit by its buses and ALU unit 27 and the value read in the memory is loaded into BG register 23 as an instruction for triggering a request for cycle CPUB and changing the state of flip flop 38. The BG cycle is then executed as above when such an instruction is directly triggered. The end of cycle signal applied to DMA circuit, either by a comparison signal from the address processor or from the point processor, triggers a new BG cycle request by flip-flop 38 which had been placed in its initial state to provide the signal IAQ.

The processor stops when the instruction IDLE of the program end is loaded into register BG 23. This instruction, by means of CROM memory 22, sets one of the bits of state register 19 to its opposite value, which indicates that the task has been terminated.

A "task" method can execute (at the speed of the VDP), manipulations of image zones (rotation, various movements, superposition), rapid initialization of the pointers, the execution of programs with tests and jumps for executing program loops, etc..

I claim:

1. A system for displaying graphic information on a video screen, comprising:

- memory means having a plurality of addressable memory locations in which said graphic information is to be stored;
- a central processing unit for controlling the information to be displayed;
- video display processor means for producing said graphic information and for storing said graphic information in said memory means;
- communication bus means interconnecting said memory means, said central processing unit, and said video display processor means, said central processing unit presenting information on said communication bus means as time-multiplexed address and data fields, said address field defining an address space having first and second value ranges, said first value range of the address space defined by said address field corresponding to locations in said memory means addressable by said central processing unit, said second value range of the address space defined by said address field corresponding to a set of instructions for the video display processor means;

said video display processor means being connected to said memory means for accessing and modifying the contents of locations in said memory means containing said graphic information;

control circuit means connected to said central processing unit, said video display processor means and said memory means for controlling access to said memory means by said video display processor means and said central processing unit;

interpretation means connected to said communication bus means, said control circuit means and said video display processor means for decoding the address fields presented by said central processing unit on said communication bus means;

said control circuit means being responsive to receiving a decoded address value in said first value range of said address space defined by said address field for enabling access between said central processing unit and said memory means, and being responsive to receiving a decoded address value in said second value range of said address space defined by said address field for controlling said video display processor means to execute an instruction corresponding to the value of said address field;

an address value providing access to said memory means from said central processing unit having a predetermined priority of operation over an address value defining an instruction to be executed by said video display processor means; and said interpretation means interrupting the operation of one of said instructions being executed by said video display processor means in response to the reception of an address value in said first value range of said address space defined by said address field corresponding to an operation of higher priority.

2. A system as set forth in claim 1, wherein said second value range of the address space defined by said address field includes first and second value range sectors corresponding to foreground instructions and background instructions respectively for said video display processor means;

a foreground instruction relating to the placement of consecutive data by said central processing unit into said video display processor means, a background instruction relating to one of a series of memory cycles directed by said central processing unit to be executed by said video display processor means, and said foreground instructions having a higher priority of execution compared to said background instructions as determined by said control circuit means; and said interpretation means interrupting the operation of one of said background instructions being executed by said video display processor means in response to the reception of an address value in said first value range sector of said second value range of the address space defined by said address field identifying a foreground instruction.

3. A system as set forth in claim 2, wherein said interpretation means comprises a decoder having inputs connected to said central processing unit and a plurality of output lines, the state of said plurality of output lines being a function of the value of the address field applied to the inputs of said decoder by said central processing unit;

address register means connected between said central processing unit and said communication bus means for receiving a memory address of a storage location within said memory means from said central processing unit;

data register means connected between said central processing unit and said communication bus means for transferring the value of a data field from the central processing unit to said communication bus means;

foreground register means connected to selected ones of said plurality of output lines of said decoder; and background register means connected to said data register means and responsive to a background instruction from said video display processor means for storing the contents of a data field;

said interpretation means enabling the execution of one or a series of background instructions following reception of a value of said address field in said second value range sector of said second value range; and said decoder being responsive to a value of said address field having a higher priority than the background instructions of said second value range sector of said second value range of the address space to enable said address register means, said data register means, and said foreground register means for reading or writing as a function of the instruction corresponding to the value of the address field.

4. A system as set forth in claim 3, further including second memory means having addressable memory locations for storing microinstructions therein for controlling said video display processor means;

said foreground register means and said background register means being connected to said second memory means; and said microinstructions stored in said second memory means being selectively addressable by said video display processor means based upon the values stored in said foreground register means and said background register means.

5. A system as set forth in claim 4, wherein said plurality of output lines of said decoder includes two output lines connected to said control circuit means to enable access to said memory means according to the value of said address field; and said control circuit means having a plurality of outputs indicating access priorities connected to the inputs of said second memory means to enable retrieval of the microinstruction selected by the contents of said foreground register means and said background register means

* * * * *